United States Patent
Okita et al.

(10) Patent No.: US 8,884,571 B2
(45) Date of Patent: Nov. 11, 2014

(54) MOTOR CONTROL APPARATUS WHICH LIMITS TORQUE COMMAND ACCORDING TO INPUT CURRENT OR POWER

(71) Applicant: Fanuc Corporation, Yamanashi (JP)

(72) Inventors: Tadashi Okita, Yamanashi (JP); Daisuke Tajima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/689,951

(22) Filed: Nov. 30, 2012

(65) Prior Publication Data

US 2013/0187589 A1    Jul. 25, 2013

(30) Foreign Application Priority Data

Jan. 25, 2012   (JP) ................... 2012-013349

(51) Int. Cl.
*G05B 9/02*    (2006.01)

(52) U.S. Cl.
CPC ........ *G05B 9/02* (2013.01); *G05B 2219/42289* (2013.01)
USPC ........................................ 318/566

(58) Field of Classification Search
CPC ... G05D 1/0066; G05D 3/122; G05D 3/1427; G05B 19/4062; G05B 2219/42092; G05B 5/01; A61B 2019/2242; A61B 2019/2292; H02P 7/0044; A47L 9/2842
See application file for complete search history.

(56) References Cited

U.S. PATENT DOCUMENTS

| | | | |
|---|---|---|---|
| 5,636,949 A * | 6/1997 | Nakamura et al. | 409/230 |
| 7,847,499 B2 | 12/2010 | Nakamura et al. | |
| 2005/0077853 A1 * | 4/2005 | Nagakura | 318/432 |
| 2006/0038524 A1 | 2/2006 | Okamoto et al. | |
| 2007/0046238 A1 * | 3/2007 | Xu | 318/571 |
| 2009/0104855 A1 * | 4/2009 | DiNardi | 451/58 |
| 2009/0160380 A1 * | 6/2009 | Yamada et al. | 318/400.15 |
| 2009/0251086 A1 * | 10/2009 | Sekimoto et al. | 318/400.23 |
| 2009/0309531 A1 * | 12/2009 | Hamahata | 318/565 |

(Continued)

FOREIGN PATENT DOCUMENTS

| CN | 1738176 A | 2/2006 |
|---|---|---|
| CN | 101729019 A | 6/2010 |

(Continued)

OTHER PUBLICATIONS

Office Action with English translation dated Apr. 9, 2013 (7 pages).

(Continued)

*Primary Examiner* — Shawki S Ismail
*Assistant Examiner* — Zoheb Imtiaz
(74) *Attorney, Agent, or Firm* — Lowe Hauptman & Ham, LLP

(57) ABSTRACT

A motor control apparatus includes, a converter which converts input AC to DC for output, an inverter which converts the DC output of the converter to provide an AC output for driving a motor, and an inverter control part for controlling the same, and a numerical control part which outputs a motor operation command for commanding the operation of the motor, and wherein when AC current or power input to the converter lies outside a predetermined range, the inverter control part controls the AC output of the inverter so that the motor is operated in accordance with a limited torque command produced by limiting a torque command originally specified in the motor operation command.

4 Claims, 17 Drawing Sheets

(56) References Cited

U.S. PATENT DOCUMENTS

| | | | |
|---|---|---|---|
| 2011/0221377 A1* | 9/2011 | Ueno | 318/565 |
| 2011/0260662 A1 | 10/2011 | Yoshida et al. | |
| 2012/0001586 A1* | 1/2012 | Maruyama et al. | 318/798 |
| 2013/0099710 A1* | 4/2013 | Okamoto | 318/434 |

FOREIGN PATENT DOCUMENTS

| | | |
|---|---|---|
| CN | 102237846 A | 11/2011 |
| DE | 1803742 A1 | 7/1970 |
| DE | 4330537 B4 | 6/2006 |
| EP | 1460756 A1 | 9/2004 |
| JP | 4106348 A | 4/1992 |
| JP | 7010198 B2 | 2/1995 |
| JP | 1146483 A | 2/1999 |
| JP | 11275869 A | 10/1999 |
| JP | 4111138 B2 | 7/2008 |
| JP | 2009261078 A | 11/2009 |
| JP | 2010233304 A | 10/2010 |

OTHER PUBLICATIONS

Office Action mailed Jan. 17, 2014, corresponds to Chinese patent application No. 201310027479.3.

* cited by examiner

MOTOR CONTROL APPARATUS WHICH LIMITS TORQUE COMMAND ACCORDING TO INPUT CURRENT OR POWER

RELATED APPLICATIONS

The present application is based on, and claims priority from, Japanese Application Number 2012-013349, filed Jan. 25, 2012, the disclosure of which is hereby incorporated by reference herein in its entirety.

BACKGROUND OF THE INVENTION

1. Field of the Invention

The present invention relates to a motor control apparatus which supplies drive power to a motor by first converting input AC to DC for output and then converting the DC output back to AC for driving the motor.

2. Description of the Related Art

In a machine tool system, motors are provided one for each drive axis of the machine tool, and these motors are driven and controlled by a motor control apparatus. For example, a spindle motor is used for rotating the tool or work, and a servo motor is used for contouring control. The motor control apparatus commands and controls the motor speed, torque, or rotor position of each of the motors that drive the respective drive axes of the machine tool.

The motor control apparatus includes a converter which converts AC input to DC for output, an inverter which converts the DC output of the converter to produce an AC output of a desired frequency for driving the motor, and a numerical control part which outputs a motor operation command for controlling motor operation such as the speed, torque, or rotor position of the motor connected to the AC output side of the inverter.

As many inverters are provided as there are motors in order to drive and control the motors by separately supplying drive power to each of the motors connected to the respective drive axes of the machine tool. Each inverter incorporates an inverter control part which controls the AC output of the inverter so that the motor is operated in accordance with the motor operation command supplied from the numerical control part. On the other hand, usually only one converter is provided for the plurality of inverters in order to save on the cost and installation space of the motor control apparatus.

When supplying large AC power from the inverter to the motor, such as when driving the motor with a large output, large power also has to be supplied from the converter to the inverter, and as a result, therefore an excessive current may flow into the AC side of the converter. When, for example, a safety device is installed, if an output exceeding the allowable output of the converter is demanded by the inverter, the safety device is activated, issuing an alarm to stop the motor control apparatus in order to prevent a large current exceeding the allowable limit from flowing into the AC input side of the converter.

For example, for use in air-conditioning equipment, several types of devices that limit the AC current to be input to the air-conditioning equipment are proposed in order to prevent the activation of a power breaker provided on the AC input side of the equipment.

For example, Japanese Unexamined Patent Publication No. H04-106348 discloses a technique wherein, in air-conditioning equipment having a circuit that first converts an AC input to a DC output and then converts the DC output to AC for driving a compressor, a limit value is set on the input AC current and, when the input AC current exceeds the limit value, the limit value is lowered in a stepwise manner by an amount equal to the difference, thereby reducing the output frequency of the AC for driving the compressor, causing the compressor to run in a low performance state and thus limiting the AC current to be input to the air-conditioning equipment.

The above-cited Japanese Unexamined Patent Publication No. H04-106348, Japanese Examined Patent Publication No. H07-10198 and Japanese Unexamined Patent Publication No. 2010-233304, for example, each disclose a technique wherein, in air-conditioning equipment having a circuit that first converts an AC input to a DC output and then converts the DC output to AC for driving a compressor, the AC input current and DC output voltage of an AC/DC conversion circuit are monitored and, when the DC output voltage drops, the AC output frequency of a DC/AC converter is reduced, thereby causing the compressor to run at a low rotational speed and thus limiting the AC current to be input to the air-conditioning equipment.

In other fields than the above-described air-conditioning equipment field, there are also proposed devices for preventing the occurrence of an overcurrent at the power supply side due to excessive power drain by a motor connected to the AC output side. For example, in the field of electric vehicles, Japanese Patent No. 4111138 proposes a technique that limits the motor output to prevent failure when the delivery of power that exceeds the allowable load of the DC power supply is demanded from the motor.

If the motor control apparatus stops due to an alarm condition as earlier described, not only the entire operation of the machine tool equipped with the motors being driven under the control of the motor control apparatus, but the product being worked on is also significantly affected. For example, before restarting the motor control apparatus once stopped due to an alarm condition, first it is necessary to remove the event that caused the alarm condition, and then to check whether any problem has been caused to other machine tools due to the stoppage or whether any damage or defect has been caused to the product being worked on, and it is also necessary to move the stopped tool and change to their initial positions; restart the apparatus which takes considerable time, and human labor.

In order to prevent the stoppage of the motor control apparatus in an alarm condition, it has been common to design the motor control apparatus by employing a converter capable of delivering the power that is deemed necessary when all the inverters connected to the converter are operated at their maximum output power. When the converter selected in this way is employed, the converter can always supply sufficient output power, which serves to avoid a situation where an excessive current that exceeds the allowable limit flows into the AC input side of the converter. However, in the case of a machine tool whose operation seldom requires all the inverters to be operated simultaneously at their maximum output power, the capacity of the converter becomes larger than necessary, and hence the problem that the prior practice is disadvantageous in term of installation space and cost.

In one possible approach to solving this problem, when it is expected that all the inverters are not required to be operated simultaneously at their maximum output power, the maximum output required of each inverter is predicted from the expected motor operating conditions, and the converter is chosen to be able to provide enough power so that each inverter can output power that falls within the predicted maximum output. However, if the prediction is wrong, or if there arises a situation where the motor is operated outside the predicted range, the maximum allowable output of the thus chosen converter may be exceeded, in which case it is not possible to eliminate the possibility that an excessive current that exceeds the allowable limit flows into the AC input side of the converter, causing the motor control apparatus to stop in an alarm condition.

On the other hand, the techniques disclosed in the above-cited Japanese Unexamined Patent Publication No. H04-106348, Japanese Examined Patent Publication No. H07-10198, and Japanese Unexamined Patent Publication No. 2010-233304 each concern air-conditioning equipment, but since not only the current on the AC input side of the air-conditioning equipment (i.e., the AC input side of the converter), but the voltage on the DC output side of the converter has also to be monitored, the configuration of the detection mechanism becomes complex, and the installation space and cost increases. Furthermore, the techniques disclosed in the above-cited Japanese Unexamined Patent Publication No. H04-106348, Japanese Examined Patent Publication No. H07-10198, and Japanese Unexamined Patent Publication No. 2010-233304 each involve reducing the motor rotational speed by reducing the AC output frequency, but in the case of a machine tool system, reducing the motor rotational speed results in reducing the machining accuracy. On the other hand, the technique disclosed in Japanese Patent No. 4111138 uses a DC power supply as the input; therefore, the technique cannot be applied to the type of apparatus that converts input AC to DC for output and then converts the DC output back to AC for driving a motor.

SUMMARY OF THE INVENTION

In view of the above problems, it is an object of the present invention to a motor control apparatus which supplies drive power to a motor by first converting AC input to DC for output and then converting the DC output back to AC for driving the motor, and more particularly, a motor control apparatus that is low cost, space saving, and simple in construction and that can prevent an excessive current exceeding an allowable limit from flowing into the AC side of a converter.

The motor control apparatus includes, a converter which converts input AC to DC for output, and a control part for the same, an inverter which converts the DC output of the converter to provide an AC output for driving a motor, and a control part for the same, and a numerical control part which outputs a motor operation command for commanding the operation of the motor, and wherein when AC current or power input to the converter lies outside a predetermined range, the inverter control part controls the AC output of the inverter so that the motor is operated in accordance with a limited torque command produced by limiting a torque command originally specified in the motor operation command.

According to a first mode, the motor control apparatus further includes a converter control part which controls the DC output of the converter, and wherein the converter control part includes a detecting unit which detects the AC current or power input to the converter, a determining unit which, based on the result of the detection by the detecting unit, determines whether or not the AC current or power input to the converter lies outside the predetermined range, and a notifying unit which notifies the inverter control part of the result of the determination made by the determining unit, wherein when the result of the determination indicates that the AC current or power input to the converter lies outside the predetermined range, the inverter control part controls the AC output of the inverter so that the motor is operated in accordance with a limited torque command produced by limiting the torque command originally specified in the motor operation command supplied from the numerical control part.

According to a second mode, the motor control apparatus further includes a converter control part which controls the DC output of the converter, and wherein the converter control part includes a detecting unit which detects the AC current or power input to the converter and a notifying unit which notifies the inverter control part of the result of the detection made by the detecting unit, and the inverter control part includes a determining unit which determines, based on the result of the detection, whether or not the AC current or power input to the converter lies outside the predetermined range, wherein when the result of the determination indicates that the AC current or power input to the converter lies outside the predetermined range, the inverter control part controls the AC output of the inverter so that the motor is operated in accordance with a limited torque command produced by limiting the torque command originally specified in the motor operation command supplied from the numerical control part.

According to a third mode, the motor control apparatus further includes a converter control part which controls the DC output of the converter, and wherein the converter control part includes a detecting unit which detects the AC current or power input to the converter, a determining unit which, based on the result of the detection by the detecting unit, determines whether or not the AC current or power input to the converter lies outside the predetermined range, and a notifying unit which notifies the numerical control part of the result of the determination made by the determining unit, wherein when the result of the determination indicates that the AC current or power input to the converter lies outside the predetermined range, the numerical control part modifies the motor operation command and outputs the modified motor operation command so that the motor is operated in accordance with a limited torque command produced by limiting the torque command originally specified in the motor operation command.

According to a fourth mode, the motor control apparatus further includes a converter control part which controls the DC output of the converter, and wherein the converter control part includes a detecting unit which detects the AC current or power input to the converter and a notifying unit which notifies the numerical control part of the result of the detection made by the detecting unit, and the numerical control part includes a determining unit which determines, based on the result of the detection, whether or not the AC current or power input to the converter lies outside the predetermined range, wherein when the result of the determination indicates that the AC current or power input to the converter lies outside the predetermined range, the numerical control part modifies the motor operation command and outputs the modified motor operation command so that the motor is operated in accordance with a limited torque command produced by limiting the torque command originally specified in the motor operation command.

According to a fifth mode, the motor control apparatus drives and controls a servo motor and a spindle motor, and wherein when the AC current or power input to the converter lies outside the predetermined range, control is performed so that, between a servo motor inverter control part which controls the AC output of the inverter provided for driving the servo motor and a spindle motor inverter control part which controls the AC output of the inverter provided for driving the spindle motor, the spindle motor inverter control part controls the AC output of the inverter so that the spindle motor is operated in accordance with a limited torque command produced by limiting the torque command originally specified in the motor operation command.

According to a sixth mode, the motor control apparatus is adapted for use in a machine tool that performs cutting by using a spindle motor for rotating a tool or work and a servo motor for contouring control, the apparatus includes, a converter which converts input AC, to DC for output, a spindle motor inverter which converts the DC output of the converter to provide an AC output for driving the spindle motor, and a control part for the same, a servo motor inverter which converts the DC output of the converter to provide an AC output for driving the servo motor, and a control part for the same, and a numerical control part which outputs a motor operation command for commanding the operation of the spindle motor and the servo motor, and wherein when the AC current or power input to the converter lies outside a predetermined range, if the machine tool is not in cutting operation, then the spindle motor inverter control part controls the AC output of the spindle motor inverter so that the spindle motor is operated in accordance with a limited torque command produced by limiting the torque command originally specified in the motor operation command, and if the machine tool is in cutting operation, then the servo motor inverter control part controls the AC output of the servo motor inverter so that the servo motor is operated in accordance with a limited rotational speed command produced by limiting the rotational speed command originally specified in the motor operation command.

Preferably, in the sixth mode, the motor control apparatus further includes a converter control part which controls the DC output of the converter, and wherein the converter control part includes a detecting unit which detects the AC current or power input to the converter, a determining unit which, based on the result of the detection by the detecting unit, determines whether or not the AC current or power input to the converter lies outside the predetermined range, and a notifying unit which notifies the numerical control part of the result of the determination made by the determining unit, wherein when the result of the determination indicates that the AC current or power input to the converter lies outside the predetermined range, if the machine tool is not in cutting operation, the numerical control part modifies the motor operation command for the spindle motor and supplies the modified motor operation command to the spindle motor inverter control part so that the spindle motor is operated in accordance with a limited torque command produced by limiting the torque command originally specified in the motor operation command, and if the machine tool is in cutting operation, the numerical control part modifies the motor operation command for the servo motor and supplies the modified motor operation command to the servo motor inverter control part so that the servo motor is operated in accordance with a limited rotational speed command produced by limiting the rotational speed command originally specified in the motor operation command.

Preferably, in the sixth mode, the motor control apparatus further includes a converter control part which controls the DC output of the converter, and wherein the converter control part includes a detecting unit which detects the AC current or power input to the converter and a notifying unit which notifies the numerical control part of the result of the detection made by the detecting unit, and the numerical control part includes a determining unit which determines, based on the result of the detection, whether or not the AC current or power input to the converter lies outside the predetermined range, wherein when the result of the determination indicates that the AC current or power input to the converter lies outside the predetermined range, if the machine tool is not in cutting operation, the numerical control part modifies the motor operation command for the spindle motor and supplies the modified motor operation command to the spindle motor inverter control part so that the spindle motor is operated in accordance with a limited torque command produced by limiting the torque command originally specified in the motor operation command, and if the machine tool is in cutting operation, the numerical control part modifies the motor operation command for the servo motor and supplies the modified motor operation command to the servo motor inverter control part so that the servo motor is operated in accordance with a limited rotational speed command produced by limiting the rotational speed command originally specified in the motor operation command.

Preferably, in the sixth mode, the motor control apparatus further includes a converter control part which controls the DC output of the converter, and wherein the converter control part includes a detecting unit which detects the AC current or power input to the converter, a determining unit which, based on the result of the detection by the detecting unit, determines whether or not the AC current or power input to the converter lies outside the predetermined range, and a notifying unit which notifies the spindle motor inverter control part and the numerical control part of the result of the determination made by the determining unit, wherein when the result of the determination indicates that the AC current or power input to the converter lies outside the predetermined range, if the machine tool is not in cutting operation, then the spindle motor inverter control part controls the AC output of the inverter so that the spindle motor is operated in accordance with a limited torque command produced by limiting the torque command originally specified in the motor operation command supplied from the numerical control part, and if the machine tool is in cutting operation, then the numerical control part modifies the motor operation command for the servo motor and supplies the modified motor operation command to the servo motor inverter control part so that the servo motor is operated in accordance with a limited rotational speed command produced by limiting the rotational speed command originally specified in the motor operation command.

BRIEF DESCRIPTION OF THE DRAWINGS

The present invention will be more clearly understood with reference to the following accompanying drawings.

DETAILED DESCRIPTION

A motor control apparatus will be described below with reference to the drawings. It should, however, be understood that the present invention is not limited to the accompanying drawings, nor is it limited to the particular embodiments described herein.

Figure 1:
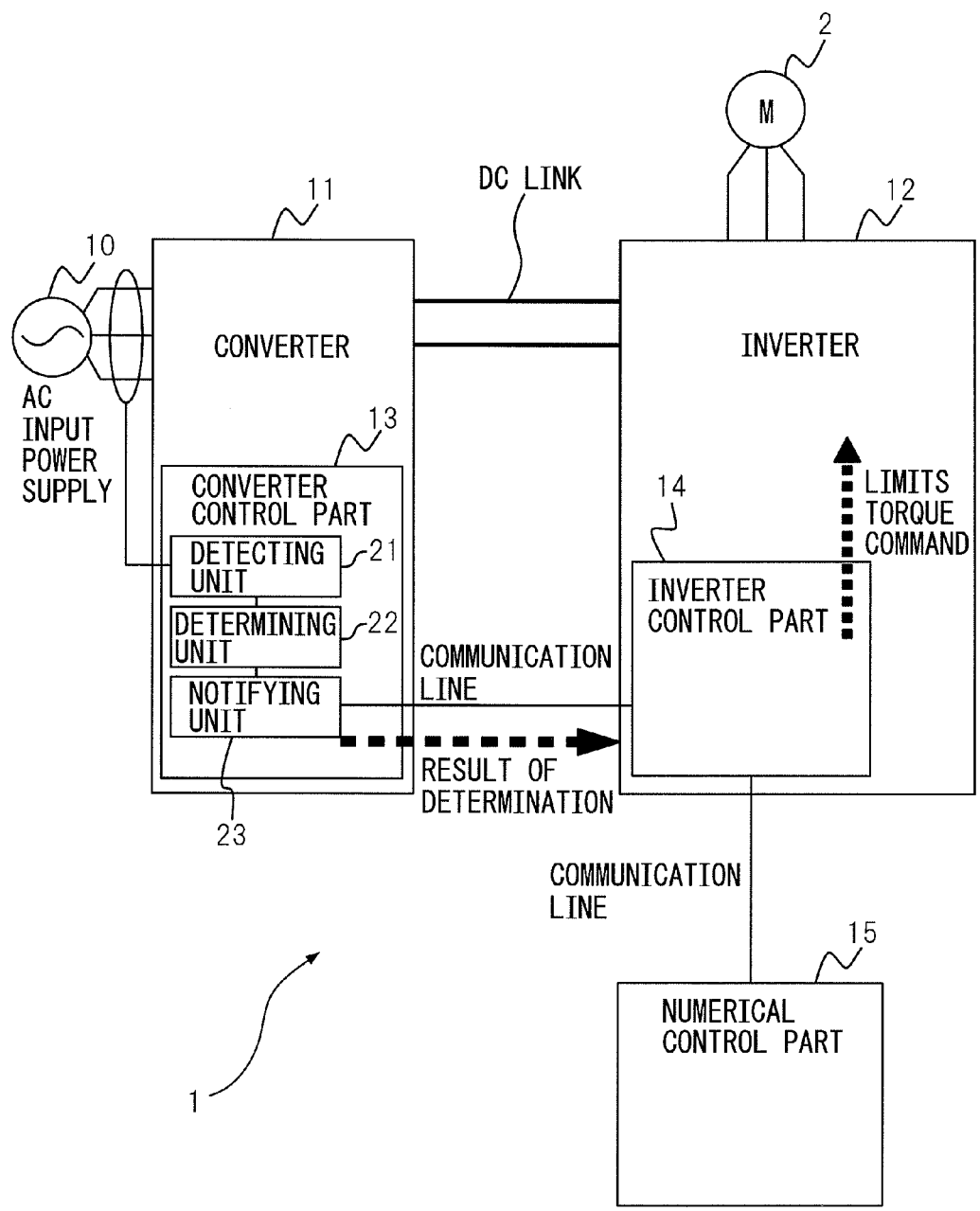
FIG. 1 is a block diagram showing a motor control apparatus according to a first embodiment.

FIG. 1 is a block diagram showing a motor control apparatus according to a first embodiment. It is to be understood that, throughout the different drawings given herein, the same reference numerals designate component elements having the same functions.

The motor control apparatus 1 of the first embodiment includes, in common with second to sixth embodiments to be described later, a converter 11 which converts AC supplied from a three-phase AC input power supply 10 to DC for output, an inverter 12 which converts the DC output of the converter 11 to provide an AC output for driving a motor 2, a numerical control part 15 which outputs a motor operation command for commanding the operation of the motor 2, an inverter control part 14 which is provided within the inverter 12 and which controls the AC output of the inverter 12 so that the motor 2 is operated in accordance with the motor operation command, and a converter control part 13 which is provided within the converter 11 and which controls the DC output of the converter 11. When the AC current or power input to the converter 11 lies outside a predetermined range, the inverter control part 14 controls the AC output of the inverter 12 so that the motor 2 is operated in accordance with a limited torque command produced by limiting the torque command originally specified in the motor operation command.

In this way, according to the first to sixth embodiments, when the AC current or power input to the converter 11 lies outside the predetermined range, the motor 2 is controlled to run with a torque lower than the normal torque commanded by the torque command originally specified in the motor operation command, so that the power consumption of the motor 2 decreases.

That is, when the AC current or power input to the converter 11 is outside the predetermined range, the motor 2 runs at an operating level (torque level) lower than the operating level (torque level) originally commanded by the numerical control part 15. Limiting the torque command may be accomplished, for example, by imposing an upper limit on the torque command to be output from the numerical control part 15 and cutting any portion exceeding the upper limit, or by multiplying the torque command by a fraction larger than 0% but smaller than 100%.

In the first embodiment, to accomplish the limiting of the motor operation command, the converter control part 13 includes, as shown in FIG. 1, a detecting unit 21 which detects the AC current or power input to the converter 11, a determining unit 22 which, based on the result of the detection by the detecting unit 21, determines whether or not the AC current or power input to the converter 11 lies outside the predetermined range, and a notifying unit 23 which notifies the inverter control part 14 of the result of the determination made by the determining unit 22. When the quantity to be detected is the AC current, the detecting unit 21 takes as the result of the detection the AC current detected by a current detector provided on the AC input side of the converter 11, and when the quantity to be detected is the AC power, the detecting unit 21 calculates the AC power from the AC current detected by the current detector provided on the AC input side of the converter 11 and the AC voltage detected by a voltage detector, and takes the result as the result of the detection. A communication line is provided between the converter control part 13 and the inverter control part 14, and the result of the determination, output from the notifying unit 23 in the converter control part 13, is transmitted via the communication line to the inverter control part 14.

When the result of the determination indicates that the AC current or power input to the converter 11 lies outside the predetermined range, the inverter control part 14 controls the AC output of the inverter 12 so that the motor 2 is operated in accordance with a limited torque command produced by limiting the torque command originally specified in the motor operation command supplied from the numerical control part 15. As a result, when the AC current or power input to the converter 11 lies outside the predetermined range, the motor 2 is controlled to run with a torque lower than the normal torque originally specified in the motor operation command, so that the power consumption of the motor 2 decreases, as a result of which the power demanded by the inverter 12 also decreases, and hence the AC current or power input to the converter 11 decreases. That is, even if a situation occurs where an output exceeding the allowable output of the converter is demanded from the inverter, for example, when supplying large AC power from the inverter to the motor, such as when driving the motor with a large output, the motor control apparatus does not stop due to an alarm condition, because an excessive current exceeding the allowable limit does not flow into the AC side of the converter.

Figure 2:
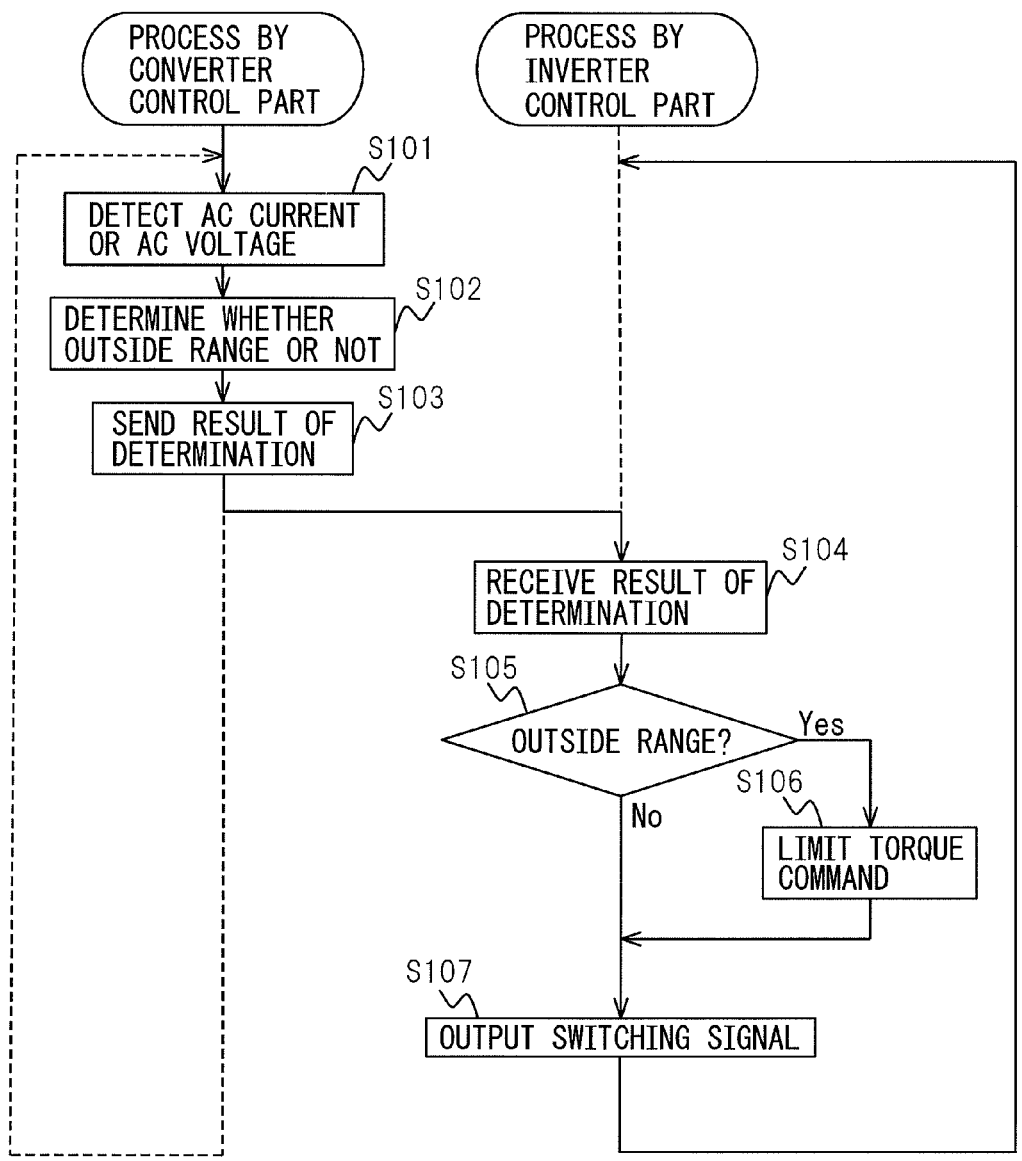
FIG. 2 is a flowchart illustrating an operational flow of the motor control apparatus according to the first embodiment.

FIG. 2 is a flowchart illustrating an operational flow of the motor control apparatus according to the first embodiment.

In step S101, the detecting unit 21 in the converter control part 13 detects the AC current or power input to the converter 11. Next, in step S102, the determining unit 22 in the converter control part 13 determines, based on the result of the detection by the detecting unit 21, whether or not the AC current or power input to the converter 11 lies outside the predetermined range. In step S103, the notifying unit 23 in the converter control part 13 notifies the inverter control part 14 of the result of the determination made by the determining unit 22. In step S104, the inverter control part 14 receives the result of the determination made by the determining unit 22 from the converter control part 13 via the communication line. If, in step S105, the result of the determination indicates that the AC current or power input to the converter 11 lies outside the predetermined range, the process proceeds to step S106, and the inverter control part 14 limits the torque command, i.e., the motor operation command received from the numeral control part 15, and thus controls the motor 2 to run with a torque lower than the torque originally specified in the motor operation command. In step S107, the inverter control part 14 outputs a switching signal for controlling the on/off operation of a switching device in the inverter 12 in accordance with the motor operation command.

Figure 3:
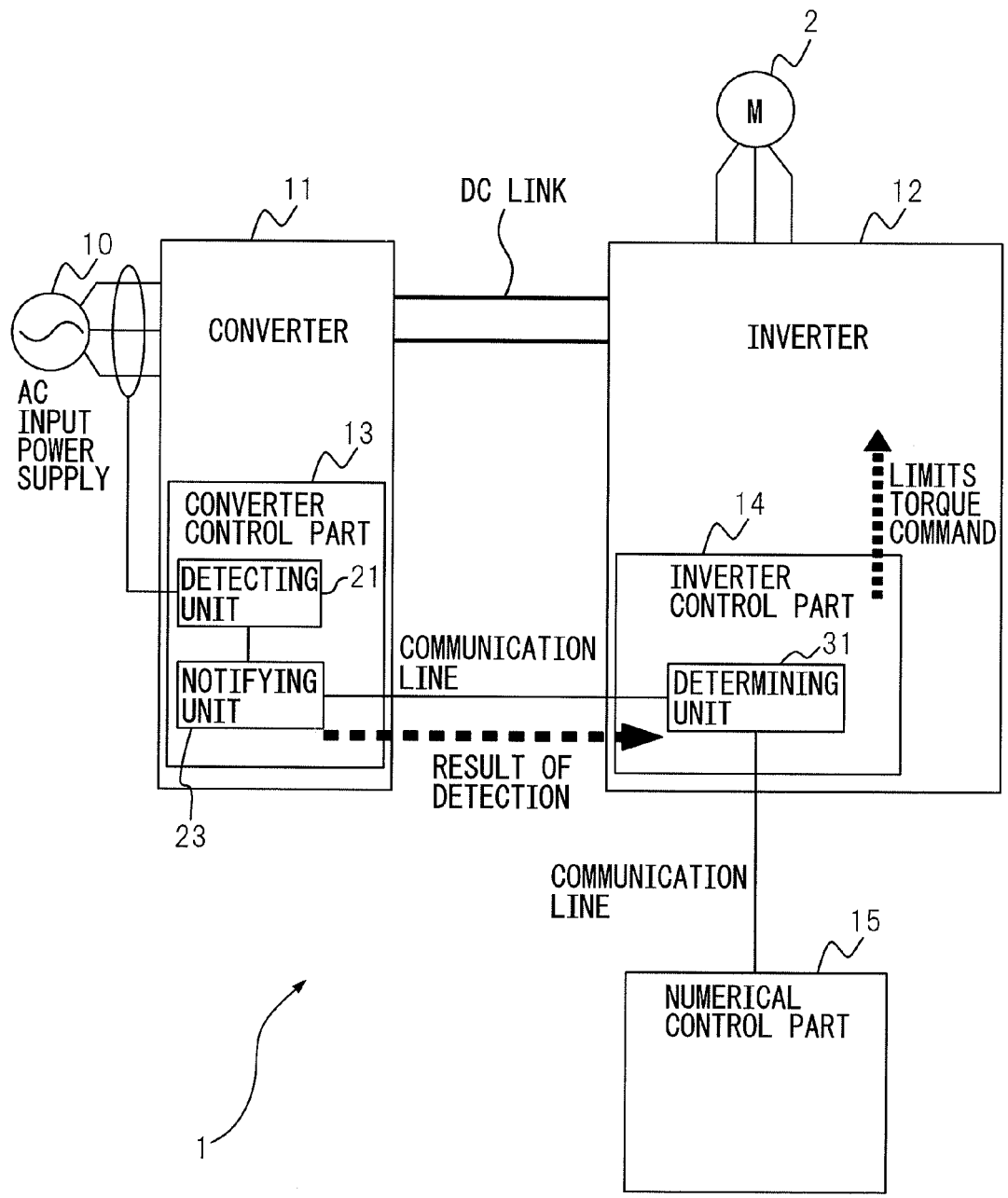
FIG. 3 is a block diagram showing a motor control apparatus according to a second embodiment.

FIG. 3 is a block diagram showing the motor control apparatus according to the second embodiment. Of the components constituting the motor control apparatus 1 according to the second embodiment, the converter 11, the inverter 12, and the numerical control part 15 are the same as the corresponding components in the first embodiment described with reference to FIG. 1, and therefore, will not be further described herein. Further, since the effect of the second embodiment is the same as that achieved in the first embodiment, the following description deals only with differences from the first embodiment.

In the second embodiment, the converter control part 13 includes a detecting unit 21 which detects the AC current or power input to the converter 11, and a notifying unit 23 which notifies the inverter control part 14 of the result of the detection made by the detecting unit 21, while the inverter control part 14 includes a determining unit 31 which determines, based on the result of the detection, whether or not the AC current or power input to the converter 11 lies outside the predetermined range. When the quantity to be detected is the AC current, the detecting unit 21 takes the AC current detected by the current detector as the result of the detection, and when the quantity to be detected is the AC power, the detecting unit 21 calculates the AC power from the AC current detected by the current detector and the AC voltage detected by the voltage detector, and takes the result as the result of the detection. A communication line is provided between the converter control part 13 and the inverter control part 14, and the result of the detection, output from the notifying unit 23 in the converter control part 13, is transmitted via the communication line to the inverter control part 14. When the result of the determination made by the determining unit 31 indicates that the AC current or power input to the converter 11 lies outside the predetermined range, the inverter control part 14 controls the AC output of the inverter 12 so that the motor 2 is operated in accordance with a limited torque command produced by limiting the torque command originally specified in the motor operation command. The same effect as that of the first embodiment can thus be obtained.

Figure 4:
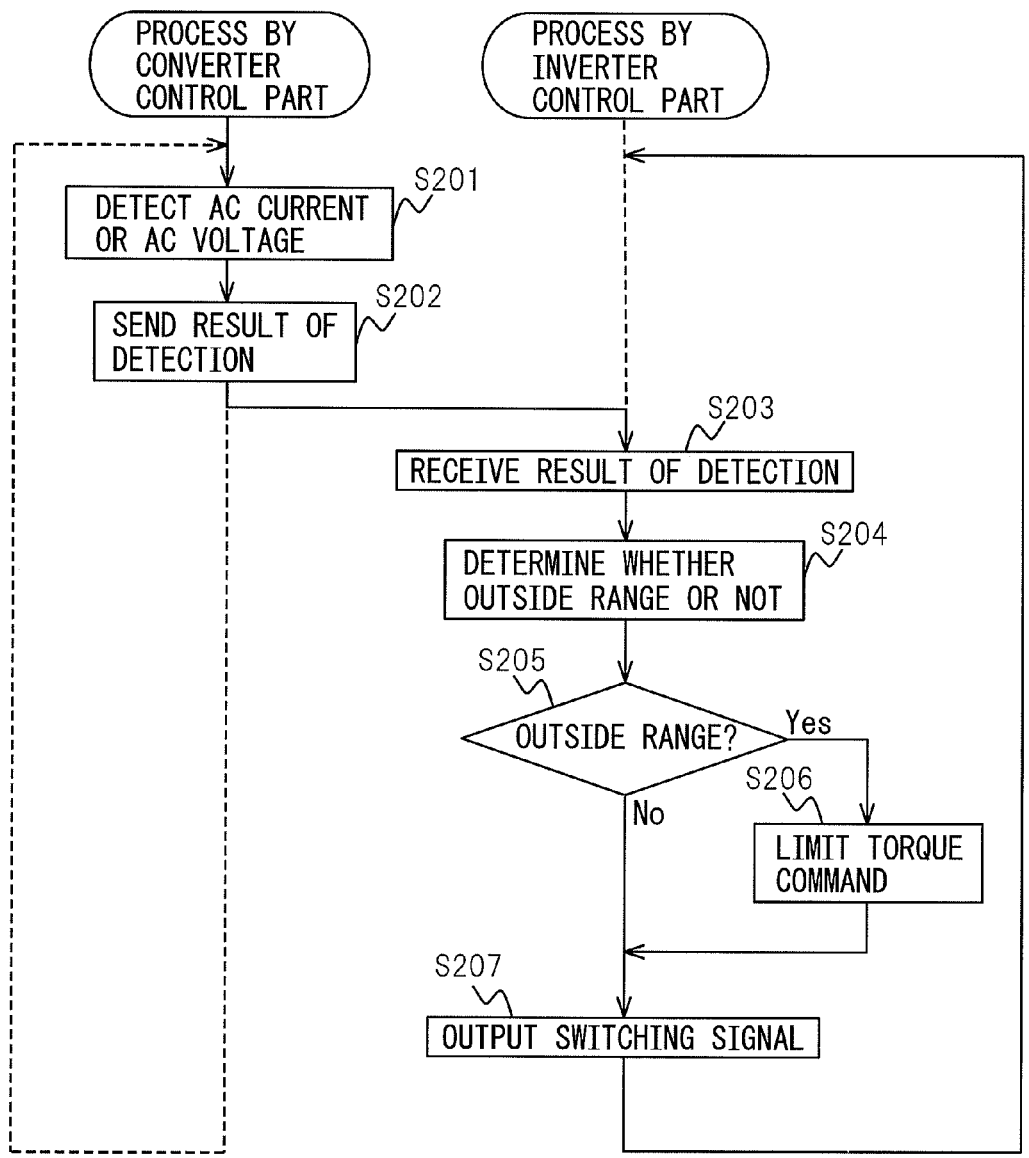
FIG. 4 is a flowchart illustrating an operational flow of the motor control apparatus according to the second embodiment.

FIG. 4 is a flowchart illustrating an operational flow of the motor control apparatus according to the second embodiment.

In step S201, the detecting unit 21 in the converter control part 13 detects the AC current or power input to the converter 11. Next, in step S202, the notifying unit 23 in the converter control part 13 notifies the inverter control part 14 of the result of the detection made by the detecting unit 21. In step S203, the inverter control part 14 receives the result of the detection made by the detecting unit 21 from the converter control part 13 via the communication line. Next, in step S204, the inverter control part 14 determines, based on the result of the detection by the detecting unit 21, whether or not the AC current or power input to the converter 11 lies outside the predetermined range. If, in step S205, the result of the determination indicates that the AC current or power input to the converter 11 lies outside the predetermined range, the process proceeds to step S206, and the inverter control part 14 limits the torque command, i.e., the motor operation command received from the numeral control part 15, and thus controls the motor 2 to run with a torque lower than the torque originally commanded by the motor operation command. In step S207, the inverter control part 14 outputs a switching signal for controlling the on/off operation of the switching device in the inverter 12 in accordance with the motor operation command.

Figure 5:
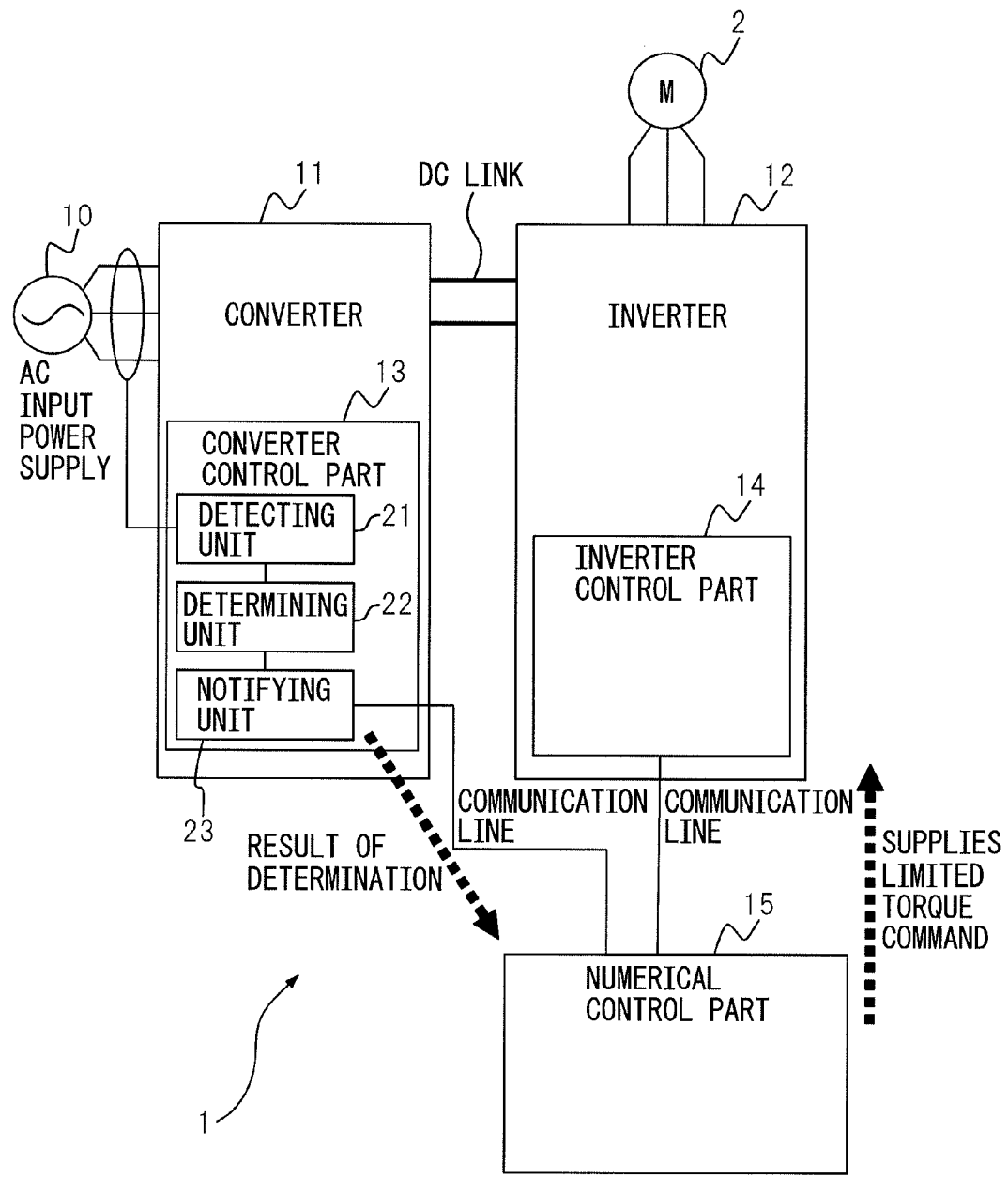
FIG. 5 is a block diagram showing a motor control apparatus according to a third embodiment.

FIG. 5 is a block diagram showing the motor control apparatus according to the third embodiment. Of the components constituting the motor control apparatus 1 according to the third embodiment, the converter 11, the inverter 12, and the inverter control part 14 are the same as the corresponding components in the first embodiment described with reference to FIG. 1, and therefore, will not be further described herein. Further, the effect of the third embodiment is the same as that achieved in the first embodiment (and the second embodiment).

In the third embodiment, the converter control part 13 includes a detecting unit 21 which detects the AC current or power input to the converter 11, a determining unit 22 which determines, based on the result of the detection by the detecting unit 21, whether or not the AC current or power input to the converter 11 lies outside the predetermined range, and a notifying unit 23 which notifies the numerical control part 15 of the result of the determination made by the determining unit 22. When the quantity to be detected is the AC current, the detecting unit 21 takes the AC current detected by the current detector as the result of the detection, and when the quantity to be detected is the AC power, the detecting unit 21 calculates the AC power from the AC current detected by the current detector and the AC voltage detected by the voltage detector, and takes the result as the result of the detection. A communication line is provided between the converter control part 13 and the numerical control part 15, and the result of the determination, output from the notifying unit 23 in the converter control part 13, is transmitted via the communication line to the numerical control part 15.

When the result of the determination indicates that the AC current or power input to the converter 11 lies outside the predetermined range, the numerical control part 15 modifies the motor operation command and outputs the modified motor operation command so that the motor 2 is operated in accordance with a limited torque command produced by limiting (reducing in value) the torque command originally specified in the motor operation command. The inverter control part 14 can achieve the same effect as that of the first embodiment by controlling the AC output of the inverter 12 based on this motor operation command.

Figure 6:
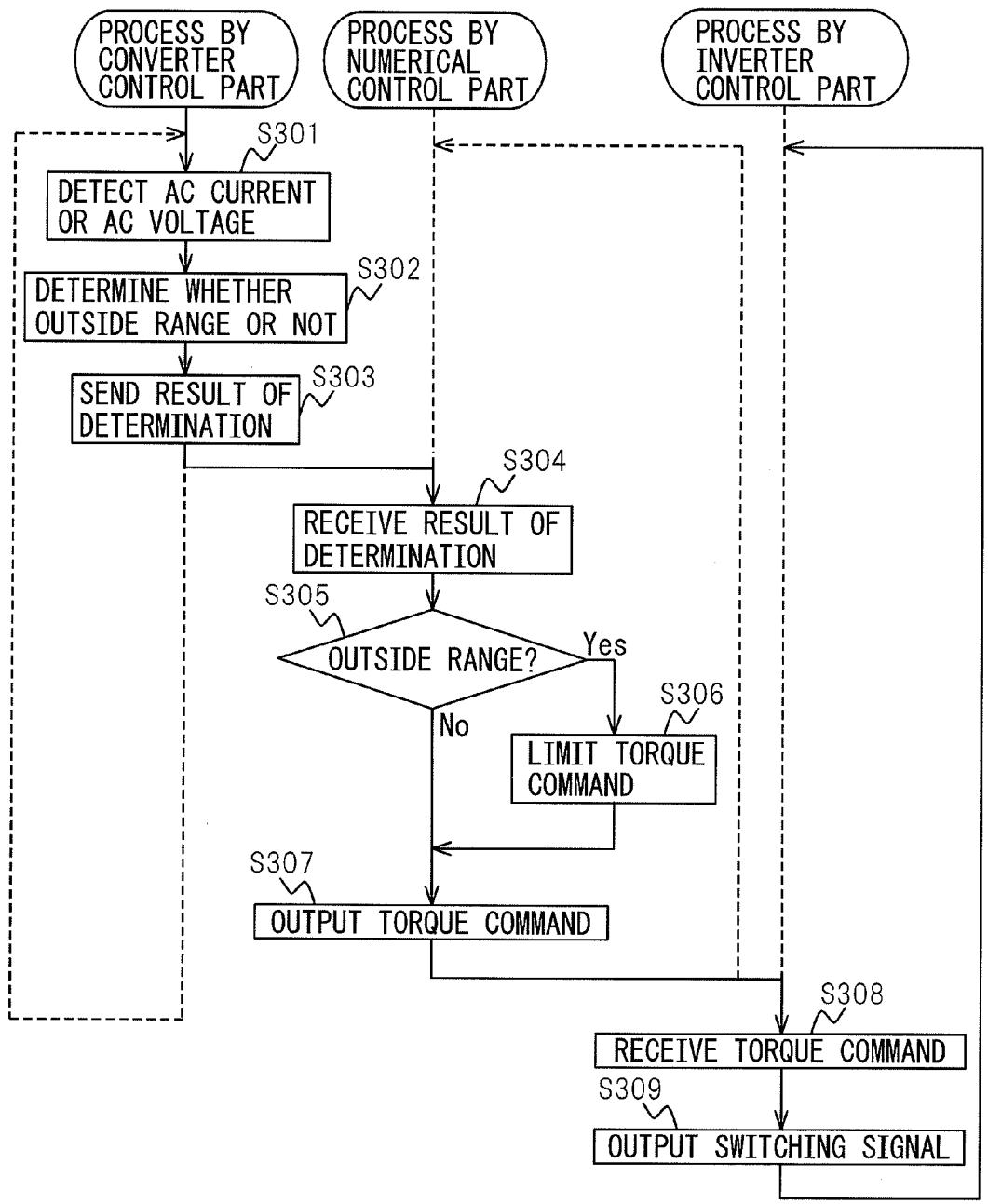
FIG. 6 is a flowchart illustrating an operational flow of the motor control apparatus according to the third embodiment.

FIG. 6 is a flowchart illustrating an operational flow of the motor control apparatus according to the third embodiment.

In step S301, the detecting unit 21 in the converter control part 13 detects the AC current or power input to the converter 11. Next, in step S302, the determining unit 22 in the converter control part 13 determines, based on the result of the detection by the detecting unit 21, whether or not the AC current or power input to the converter 11 lies outside the predetermined range. In step S303, the notifying unit 23 in the converter control part 13 notifies the numerical control part 15 of the result of the determination made by the determining unit 22. In step S304, the numerical control part 15 receives the result of the determination made by the determining unit 22 from the converter control part 13 via the communication line. If, in step S305, the result of the determination indicates that the AC current or power input to the converter 11 lies outside the predetermined range, the process proceeds to step S306, and the numerical control part 15 modifies the motor operation command so that the motor 2 will run with a torque lower than the torque originally commanded by the motor operation command. In step S307, the numerical control part 15 supplies the torque command to the inverter control part 14. More specifically, when the AC current or power input to the converter 11 lies within the predetermined range, the numerical control part 15 outputs the normal torque command, but when the AC current or power input to the converter 11 lies outside the predetermined range, the numerical control part 15 outputs the limited torque command. In step S308, the inverter control part 14 receives the torque command from the numerical control part 15 via the communication line. In step S309, the inverter control part 14 outputs a switching signal for controlling the on/off operation of the switching device in the inverter 12 in accordance with the motor operation command.

Figure 7:
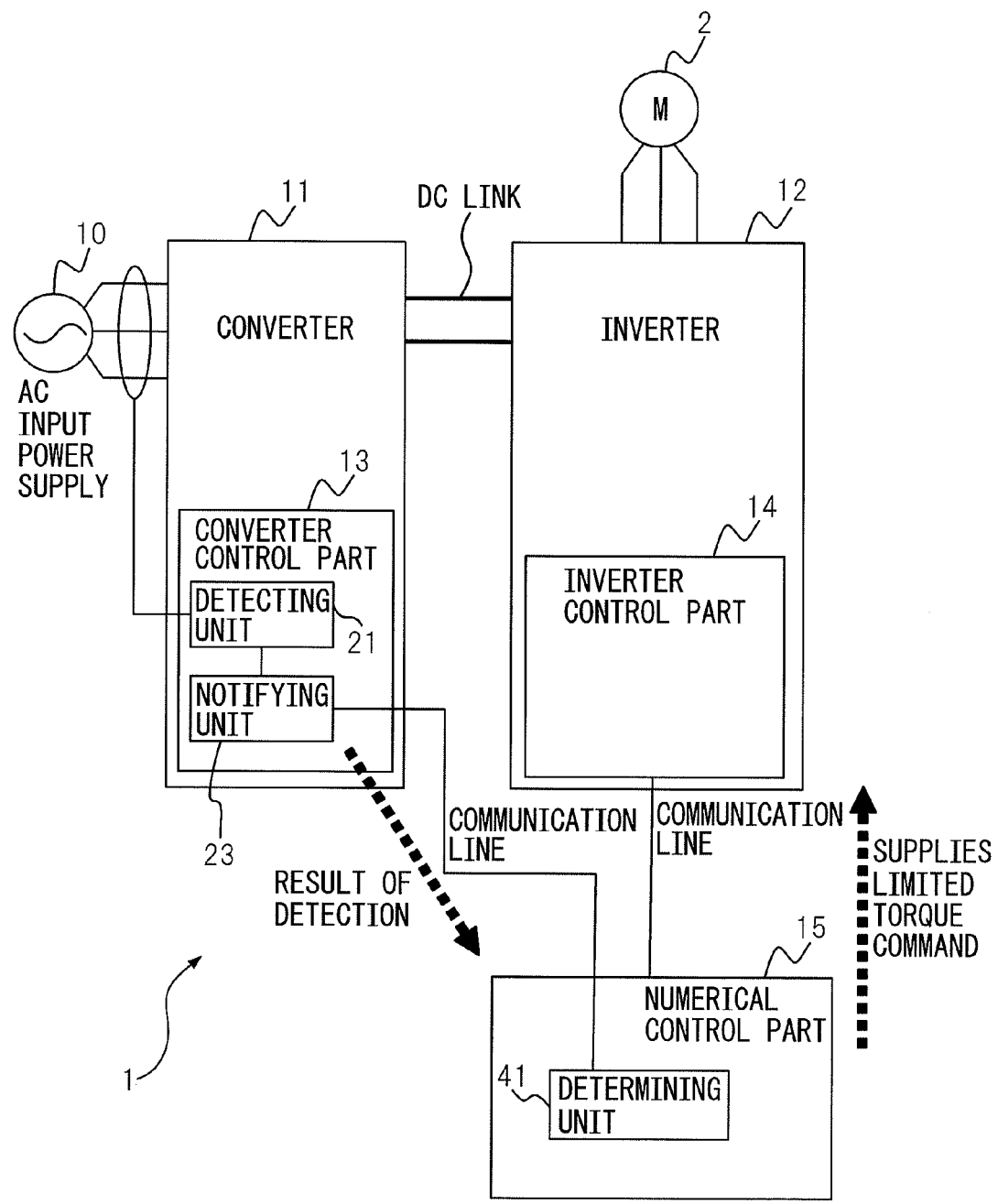
FIG. 7 is a block diagram showing a motor control apparatus according to a fourth embodiment.

FIG. 7 is a block diagram showing the motor control apparatus according to the fourth embodiment. Of the components constituting the motor control apparatus 1 according to the fourth embodiment, the converter 11, the inverter 12, and the inverter control part 14 are the same as the corresponding components in the first embodiment described with reference to FIG. 1, and therefore, will not be further described herein. Further, the effect of the fourth embodiment is the same as that achieved in the first embodiment (and the second and third embodiments).

In the fourth embodiment, the converter control part 13 includes a detecting unit 21 which detects the AC current or power input to the converter 11, and a notifying unit 23 which notifies the numerical control part 15 of the result of the detection made by the detecting unit 21. When the quantity to be detected is the AC current, the detecting unit 21 takes the AC current detected by the current detector as the result of the detection, and when the quantity to be detected is the AC power, the detecting unit 21 calculates the AC power from the AC current detected by the current detector and the AC voltage detected by the voltage detector, and takes the result as the result of the detection. A communication line is provided between the converter control part 13 and the numerical control part 15, and the result of the detection, output from the notifying unit 23 in the converter control part 13, is transmitted via the communication line to the numerical control part 15.

The numerical control part 15 includes a determining unit 41 which determines, based on the result of the detection, whether or not the AC current or power input to the converter 11 lies outside the predetermined range. When the result of the determination indicates that the AC current or power input to the converter 11 lies outside the predetermined range, the numerical control part 15 modifies the motor operation command and outputs the modified motor operation command so that the motor 2 is operated in accordance with a limited torque command produced by limiting (reducing in value) the torque command originally specified in the motor operation command. The inverter control part 14 can achieve the same effect as that of the first embodiment by controlling the AC output of the inverter 12 based on this motor operation command.

Figure 8:
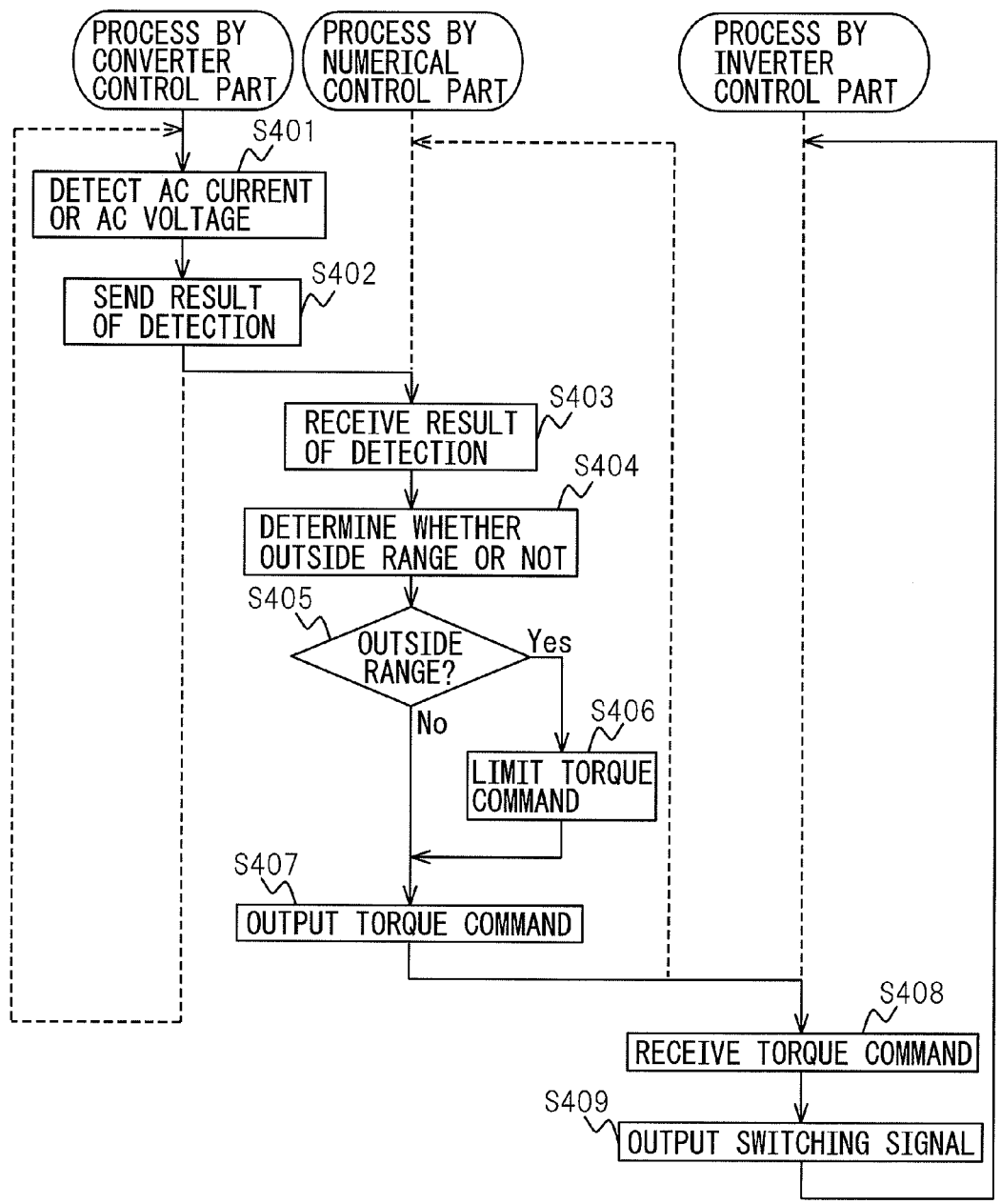
FIG. 8 is a flowchart illustrating an operational flow of the motor control apparatus according to the fourth embodiment.

FIG. 8 is a flowchart illustrating an operational flow of the motor control apparatus according to the fourth embodiment.

In step S401, the detecting unit 21 in the converter control part 13 detects the AC current or power input to the converter 11. Next, in step S402, the notifying unit 23 in the converter control part 13 notifies, via the communication line, the numerical control part 15 of the result of the detection made by the detecting unit 21. In step S403, the numerical control part 15 receives the result of the detection made by the detecting unit 21 from the converter control part 13 via the communication line. Next, in step S404, the determining unit 41 in the numerical control part 15 determines, based on the result of the detection by the detecting unit 21, whether or not the AC current or power input to the converter 11 lies outside the predetermined range. If, in step S405, the result of the determination indicates that the AC current or power input to the converter 11 lies outside the predetermined range, the process proceeds to step S406, and the numerical control part 15 modifies the motor operation command so that the motor 2 will run with a torque lower than the torque originally commanded by the motor operation command. In step S407, the numerical control part 15 supplies the torque command to the inverter control part 14. More specifically, when the AC current or power input to the converter 11 lies within the predetermined range, the numerical control part 15 outputs the normal torque command, but when the AC current or power input to the converter 11 lies outside the predetermined range, the numerical control part 15 outputs the torque command lower in value than the normal torque command as described above. In step S408, the inverter control part 14 receives the torque command from the numerical control part 15 via the communication line. In step S409, the inverter control part 14 outputs a switching signal for controlling the on/off operation of the switching device in the inverter 12 in accordance with the motor operation command.

The fifth and sixth embodiments described hereinafter each concern an example in which the motor control apparatus according to the first to fourth embodiments described above is adapted for use in a machine tool that performs cutting by using a spindle motor for rotating the tool or work and a servo motor for contouring control. The embodiments will be described below for the case where the motor control apparatus is used to control one spindle motor and one servo motor, but it is to be understood that the number of spindle motors used and the number of servo motors used are only illustrative and do not in any way limit the present invention.

Figure 9:
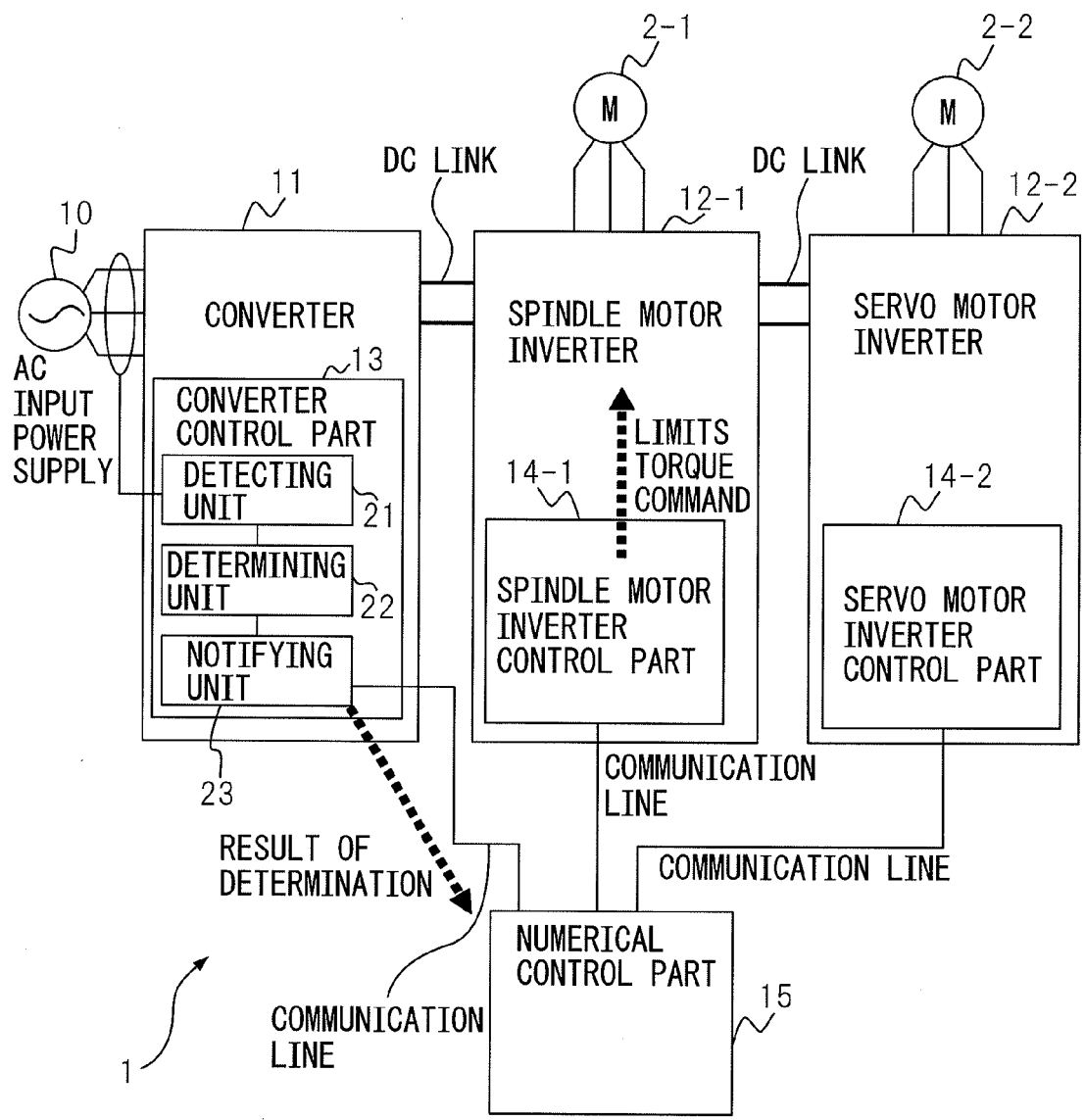
FIG. 9 is a block diagram showing a motor control apparatus according to a fifth embodiment.

FIG. 9 is a block diagram showing the motor control apparatus according to the fifth embodiment. The motor control apparatus 1 according to the fifth embodiment is adapted for use in a machine tool that performs cutting by using a spindle motor 2-1 for rotating the tool or work and a servo motor 2-2 for contouring control, and includes, in common with the subsequently described sixth embodiment, a converter 11 which converts AC supplied from an AC input power supply 10 to DC for output, a spindle motor inverter 12-1 which converts the DC output of the converter 11 to provide an AC output for driving the spindle motor 2-1, a servo motor inverter 12-2 which converts the DC output of the converter 11 to provide an AC output for driving the servo motor 2-2, a numerical control part 15 which outputs motor operation commands for commanding the operations of the spindle motor 2-1 and the servo motor 2-2, a spindle motor inverter control part 14-1 which is provided within the spindle motor inverter 12-1 and which controls the AC output of the spindle motor inverter 12-1 so that the spindle motor 2-1 is operated in accordance with the motor operation command, a servo motor inverter control part 14-2 which is provided within the servo motor inverter 12-2 and which controls the AC output of the servo motor inverter 12-2 so that the servo motor 2-2 is operated in accordance with the motor operation command, and a converter control part 13 which is provided within the converter 11 and which controls the DC output of the converter 11.

In the fifth embodiment, in common with the earlier described third embodiment, the converter control part 13 includes a detecting unit 21 which detects the AC current or power input to the converter 11, a determining unit 22 which determines, based on the result of the detection by the detecting unit 21, whether or not the AC current or power input to the converter 11 lies outside the predetermined range, and a notifying unit 23 which notifies the numerical control part 15 of the result of the determination made by the determining unit 22. When the quantity to be detected is the AC current, the detecting unit 21 takes the AC current detected by the current detector as the result of the detection, and when the quantity to be detected is the AC power, the detecting unit 21 calculates the AC power from the AC current detected by the current detector and the AC voltage detected by the voltage detector, and takes the result as the result of the detection. A communication line is provided between the converter control part 13 and the numerical control part 15, and the result of the determination, output from the notifying unit 23 in the converter control part 13, is transmitted via the communication line to the numerical control part 15.

When the AC current or power input to the converter 11 lies outside the predetermined range, the numerical control part 15 performs control so that, between the spindle motor inverter control part 14-1 that controls the AC output of the spindle motor inverter 12-1 provided for driving the spindle motor 2-1 and the servo motor inverter control part 14-2 that controls the AC output of the servo motor inverter 12-1 provided for driving the servo motor 2-2, the spindle motor inverter control part 14-1 controls the AC output of the spindle motor inverter 12-1 so that the motor is operated in accordance with a torque command lower in value than the torque command originally specified in the motor operation command supplied from the numerical control part 15. The torque command to be applied from the spindle motor inverter control part 14-1 when the AC current or power input to the converter 11 lies outside the predetermined range may be produced by the numerical control part 15 modifying the normal torque command, as in the third embodiment, or alternatively, the torque command may be produced by the spindle motor inverter control part 14-1 by limiting the torque command received from the numerical control part 15, as in the first embodiment.

Figure 10:
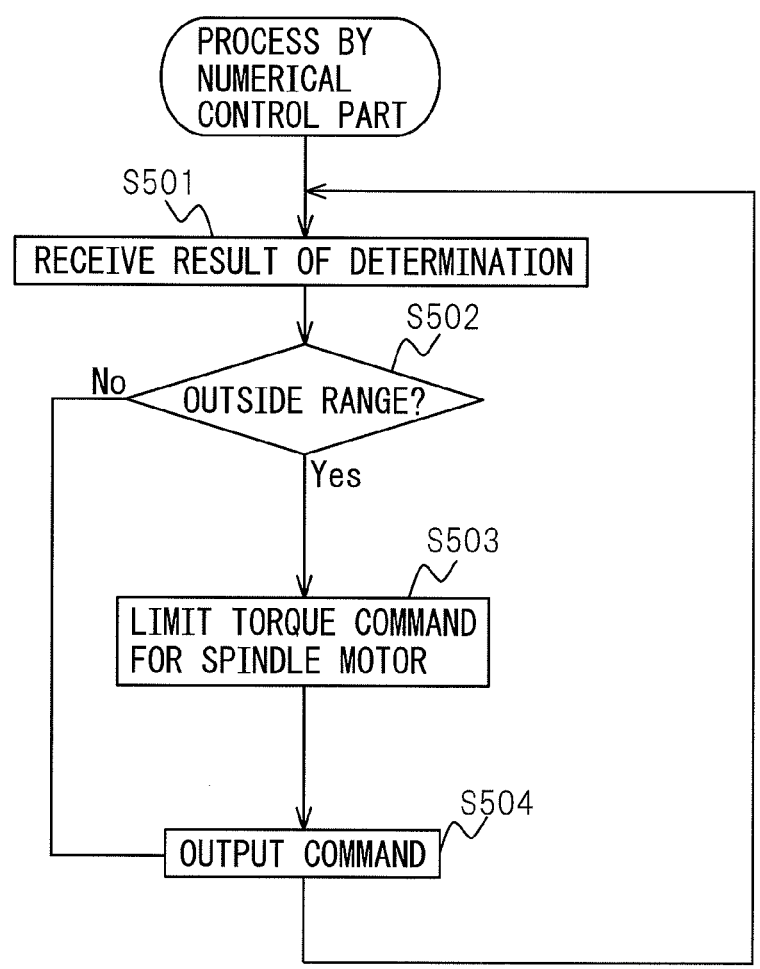
FIG. 10 is a flowchart illustrating an operational flow of a numerical control part in the motor control apparatus according to the fifth embodiment.

FIG. 10 is a flowchart illustrating an operational flow of the numerical control part in the motor control apparatus according to the fifth embodiment. The operation of the converter control part 13 in the motor control apparatus 1 according to the fifth embodiment is the same as that of the third embodiment described with reference to FIG. 6, and therefore, will not be further described herein.

In step S501, the numerical control part 15 receives the result of the determination made by the determining unit 22 from the converter control part 13 via the communication line. If, in step S502, the result of the determination indicates that the AC current or power input to the converter 11 lies outside the predetermined range, the process proceeds to step S503, otherwise the process proceeds to step S504. In step S503, the numerical control part 15 modifies the motor operation command for the spindle motor 2-1 so that the spindle motor 2-1 will run with a torque lower than the torque originally commanded by the motor operation command. In step S504, the numerical control part 15 supplies the motor operation commands to the spindle motor inverter control part 14-1 and the servo motor inverter control part 14-2, respectively. The spindle motor inverter control part 14-1 outputs a switching signal for controlling the on/off operation of the switching device in the spindle motor inverter 12-1 in accordance with the received motor operation command, and the servo motor inverter control part 14-2 outputs a switching signal for controlling the on/off operation of the switching device in the servo motor inverter 12-2 in accordance with the received motor operation command.

According to the fifth embodiment, when controlling the spindle motor 2-1 and the servo motor 2-2 by the motor control apparatus 1, if the AC current or power input to the converter 11 lies outside the predetermined range, the spindle motor inverter control part 14-1 limits the torque of the spindle motor 2-1 unrelated to contouring control, by controlling the AC output of the spindle motor inverter 12-1 so that the spindle motor 2-1 is operated in accordance with a torque command lower in value than the torque command originally specified in the motor operation command supplied from the numerical control part 15; accordingly, the same effect as that of the first to fourth embodiments can be achieved without affecting the shape accuracy of the contouring control performed using the servo motor 2-2.

Figure 11:
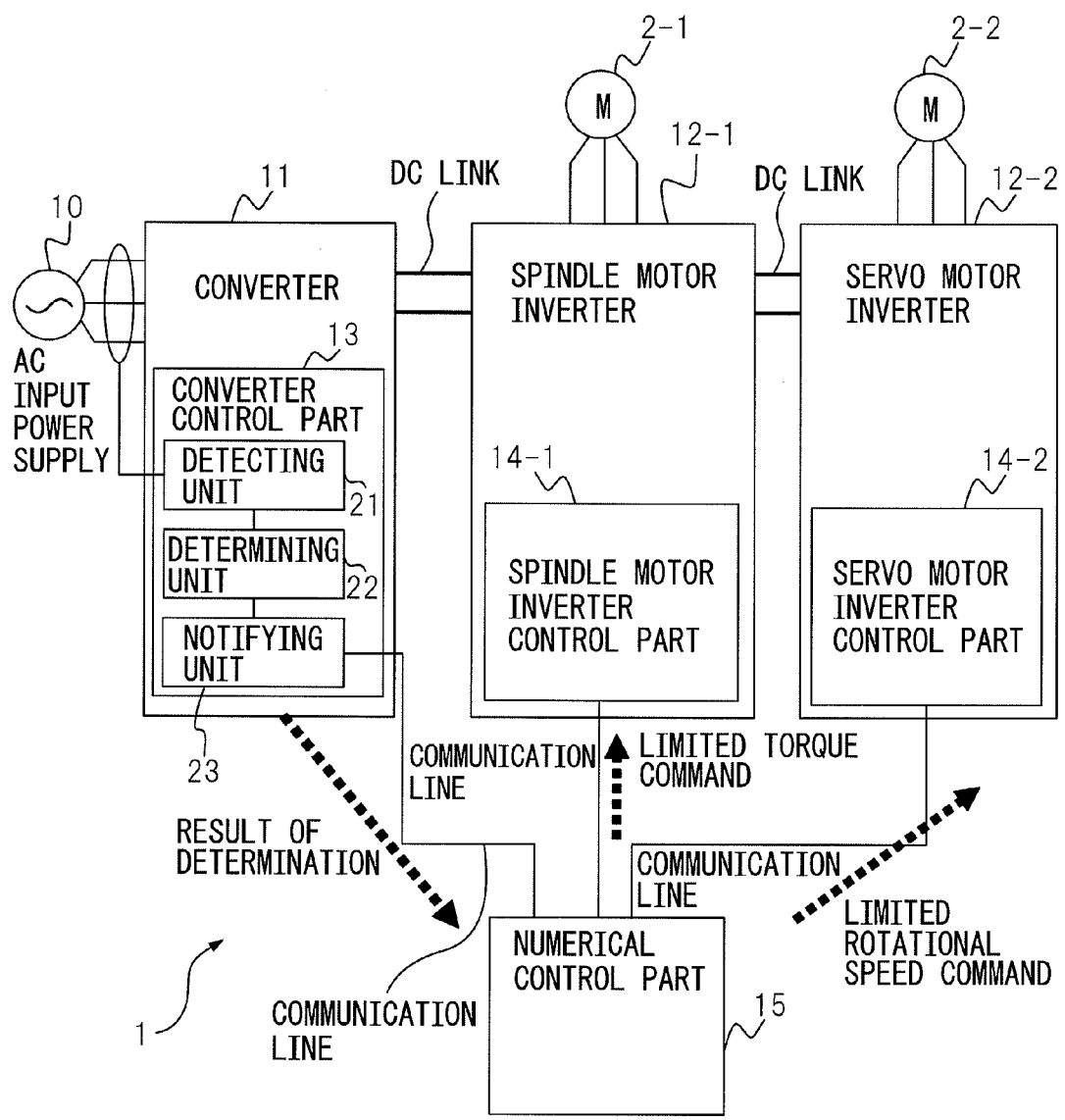
FIG. 11 is a block diagram showing a motor control apparatus according to a first specific example of a sixth embodiment.

FIG. 11 is a block diagram showing a motor control apparatus according to a first specific example of the sixth embodiment. In the motor control apparatus 1 according the first specific example of the sixth embodiment as well as second and third specific examples thereof to be described later, when the AC current or power input to the converter 11 while not in cutting operation is outside the predetermined range, the spindle motor inverter control part 14-1 controls the AC output of the spindle motor inverter 12-1 so that the spindle motor 2-1 will run with a torque lower (limited in value) than the torque originally commanded by the motor operation command. On the other hand, when the AC current or power input to the converter 11 while in cutting operation is outside the predetermined range, the servo motor inverter control part 14-2 controls the AC output of the servo motor inverter 12-2 so that the servo motor 2-2 will run at a rotational speed slower than the rotational speed originally commanded by the motor operation command. Limiting the rotational speed command may be accomplished, for example, by imposing an upper limit on the rotational speed command normally output from the numerical control part 15 and cutting any portion exceeding the upper limit, or by multiplying the rotational speed command by a fraction larger than 0% but smaller than 100%.

In this way, in the first to third specific examples of the sixth embodiment, when the AC current or power input to the converter 11 lies outside the predetermined range, the motor whose operating level (torque or rotational speed) originally specified in the motor operation command is to be limited is selected according to the operating mode of the machine tool; i.e., when not in cutting operation, the torque of the spindle motor 2-1 is limited, and when in cutting operation, the rotational speed (feed speed) of the servo motor 2-2 is limited. The reason is that, when the machine tool is performing heavy cutting by using the spindle motor 2-1 for rotating the tool or work and the servo motor 2-2 for contouring control, if the spindle motor inverter control part 14-1 performs control to limit the torque command because the AC current or power input to the converter 11 lies outside the predetermined range, the spindle motor 2-1 may be stalled due to insufficient torque, rendering the machine tool no longer able to continue the cutting operation. In view of this, when the AC current or power input to the converter 11 while in cutting operation is outside the predetermined range, the spindle motor inverter control part 14-1 does not perform control to limit the torque command, but the servo motor inverter control part 14-2 performs control to limit the rotational speed command, i.e., the feed speed command, for the serve motor 2-2, thereby reducing the cutting load of the spindle motor 2-1 during the cutting operation, and thus preventing an excessive current exceeding the allowable limit from flowing into the AC side of the converter 11, while avoiding a situation where the motor is stalled. On the other hand, when the AC current or power input to the converter 11 while not in cutting operation is outside the predetermined range, if the spindle motor inverter control part 14-1 performs control to limit the torque command, the acceleration/deceleration torque will be limited and the acceleration/deceleration time will increase, but this does not present any problem to the cutting operation.

In the first specific example of the sixth embodiment, the converter control part 13 includes, as shown in FIG. 11, a detecting unit 21 which detects the AC current or power input to the converter 11, a determining unit 22 which, based on the result of the detection by the detecting unit 21, determines whether or not the AC current or power input to the converter 11 lies outside the predetermined range, and a notifying unit 23 which notifies the numerical control part 15 of the result of the determination made by the determining unit 22. A communication line is provided between the converter control part 13 and the numerical control part 15, and the result of the determination, output from the notifying unit 23 in the converter control part 13, is transmitted via the communication line to the numerical control part 15.

When the result of the determination indicates that the AC current or power input to the converter 11 lies outside the predetermined range, if the machine tool is not in cutting operation, the numerical control part 15 modifies the motor operation command for the spindle motor 2-1 so that the spindle motor 2-1 will run with a torque lower (limited in value) than the torque originally commanded by the motor operation command, and supplies the thus modified command to the spindle motor inverter control part 14-1; on the other hand, if the machine tool is in cutting operation, the numerical control part 15 modifies the motor operation command for the servo motor 2-2 so that the servo motor 2-2 will run at a rotational speed slower than the rotational speed originally commanded by the motor operation command, and supplies the thus modified command to the servo motor inverter control part 14-2.

Figure 12:
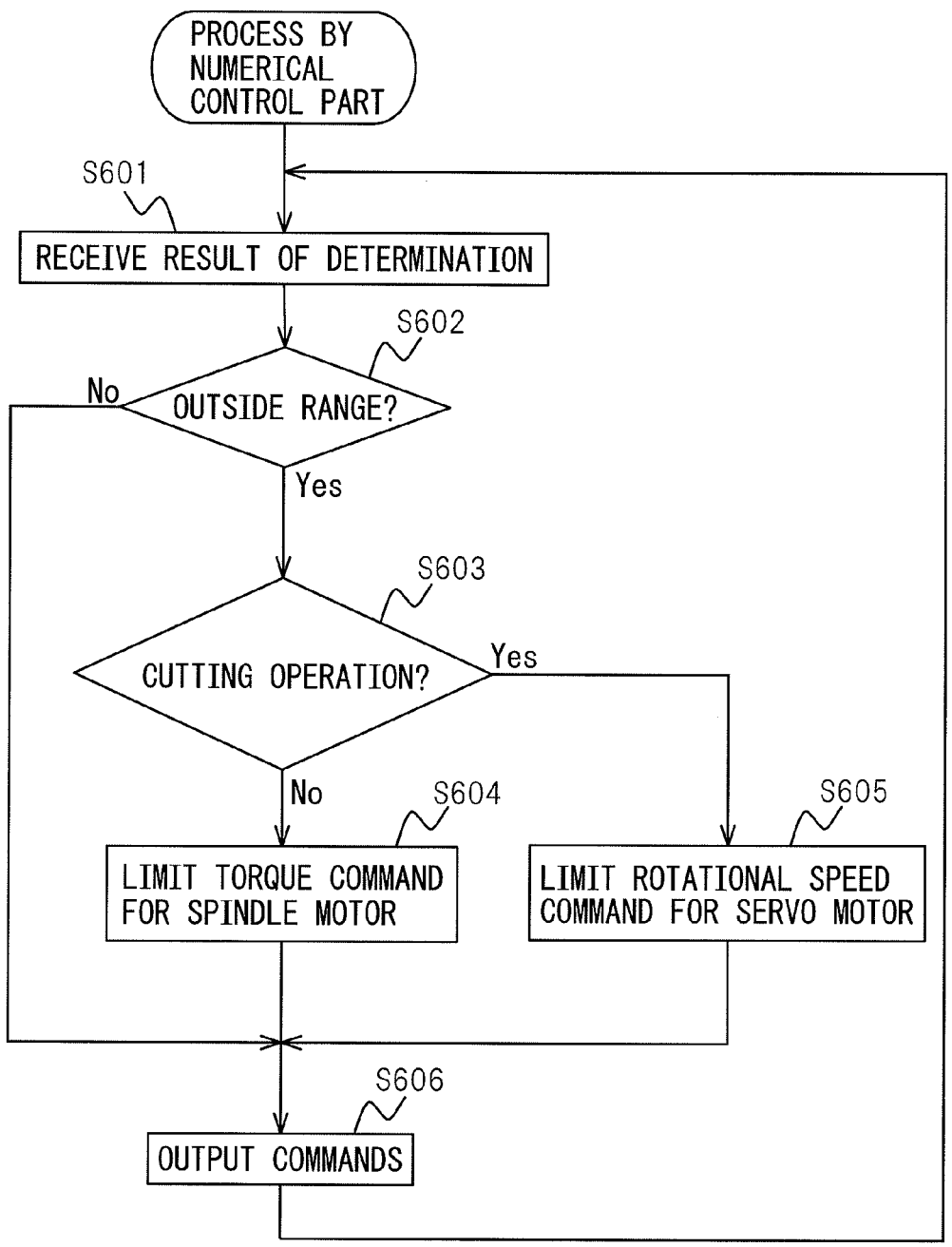
FIG. 12 is a flowchart illustrating an operational flow of the motor control apparatus according to the first specific example of the sixth embodiment.

FIG. 12 is a flowchart illustrating an operational flow of the numerical control part in the motor control apparatus according to the first specific example of the sixth embodiment. The operation of the converter control part 13 in the motor control apparatus 1 according to the first specific example of the sixth embodiment is the same as that of the third embodiment described with reference to FIG. 6, and therefore, will not be further described herein.

In step S601, the numerical control part 15 receives the result of the determination made by the determining unit 22 from the converter control part 13 via the communication line. If, in step S602, the result of the determination indicates that the AC current or power input to the converter 11 lies outside the predetermined range, the process proceeds to step S603, otherwise the process proceeds to step S606. In step S603, the numerical control part 15 determines whether the machine tool is in cutting operation or not. If it is in cutting operation, the process proceeds to step S605; otherwise, the process proceeds to step S604. In step S604, the numerical control part 15 modifies the motor operation command for the spindle motor 2-1 so that the spindle motor 2-1 will run with a torque lower than the torque originally commanded by the motor operation command. On the other hand, in step S605, the numerical control part 15 modifies the motor operation command for the servo motor 2-2 so that the servo motor 2-2 will run at a rotational speed slower than the rotational speed originally commanded by the motor operation command. In step S606, the numerical control part 15 supplies the motor operation commands to the spindle motor inverter control part 14-1 and the servo motor inverter control part 14-2, respectively. The spindle motor inverter control part 14-1 outputs a switching signal for controlling the on/off operation of the switching device in the spindle motor inverter 12-1 in accordance with the received motor operation command, and the servo motor inverter control part 14-2 outputs a switching signal for controlling the on/off operation of the switching device in the servo motor inverter 12-2 in accordance with the received motor operation command.

Figure 13:
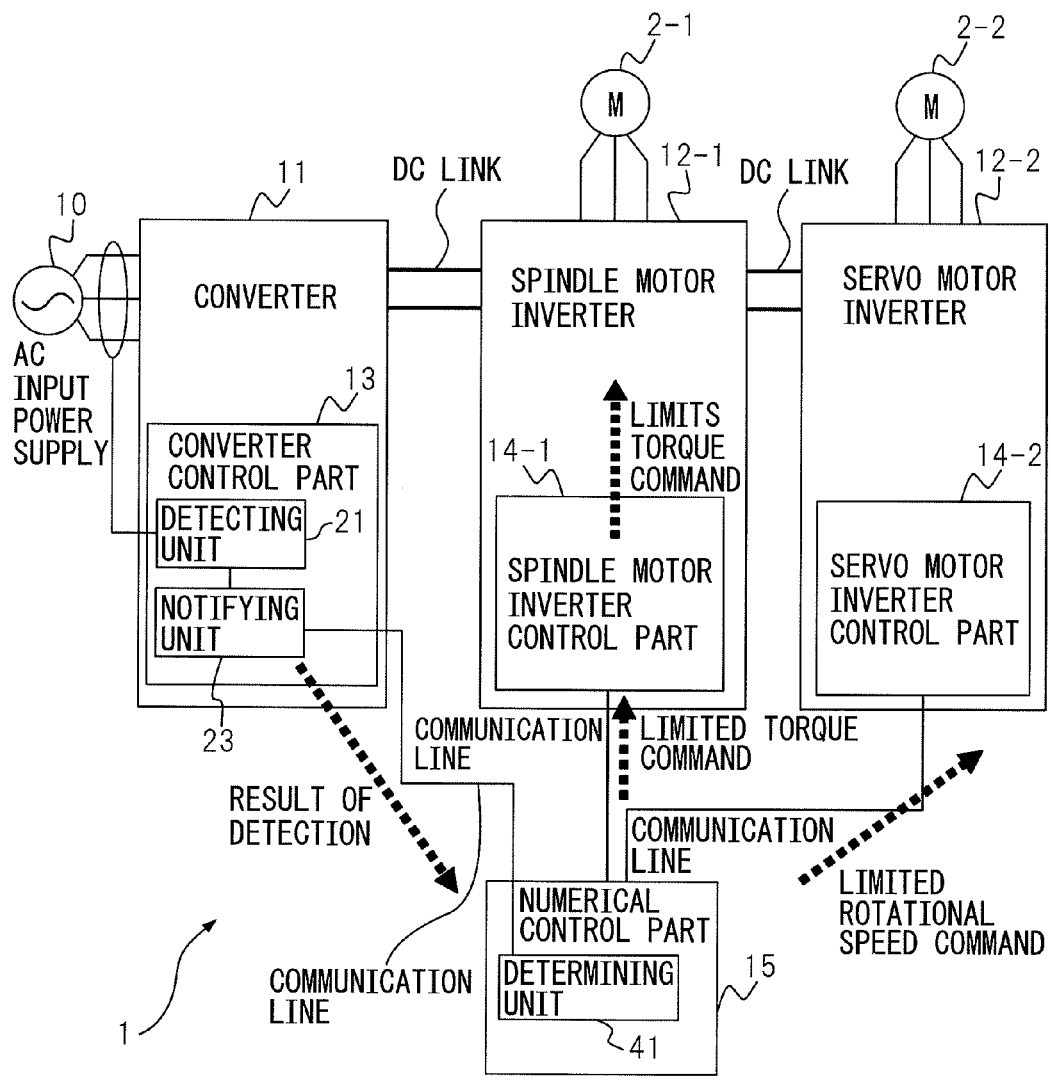
FIG. 13 is a block diagram showing a motor control apparatus according to a second specific example of the sixth embodiment.

In the first specific example of the sixth embodiment described above, the determining unit 22 that determines whether or not the AC current or power input to the converter 11 lies outside the predetermined range has been provided within the converter control part 13, but in the second specific example of the sixth embodiment, this determining unit is provided within the numerical control part 15, as in the fourth embodiment earlier described with reference to FIG. 7. FIG. 13 is a block diagram showing the motor control apparatus according to the second specific example of the sixth embodiment.

As shown in FIG. 13, in the second specific example of the sixth embodiment, the detecting unit 21 that detects the AC current or power input to the converter 11 and the notifying unit 23 that notifies the numerical control part 15 of the result of the detection made by the detecting unit 21 are provided within the converter control part 13. A communication line is provided between the converter control part 13 and the numerical control part 15, and the result of the detection, output from the notifying unit 23 in the converter control part 13, is transmitted via the communication line to the numerical control part 15.

The determining unit 41 that determines, based on the result of the detection, whether or not the AC current or power input to the converter 11 lies outside the predetermined range is provided within the numerical control part 15. When the result of the determination made by the determining unit 41 indicates that the AC current or power input to the converter 11 lies outside the predetermined range, if the machine tool is not in cutting operation, the numerical control part 15 modifies the motor operation command for the spindle motor 2-1 so that the spindle motor 2-1 is operated in accordance with a torque command lower in value than the torque command originally specified in the motor operation command, and supplies the thus modified motor operation command to the spindle motor inverter control part 14-1; on the other hand, if the machine tool is in cutting operation, the numerical control part 15 modifies the motor operation command for the servo motor 2-2 so that the servo motor 2-2 is operated in accordance with a rotational speed command lower in value than the rotational speed command originally specified in the motor operation command, and supplies the thus modified motor operation command to the servo motor inverter control part 14-2.

Figure 14:
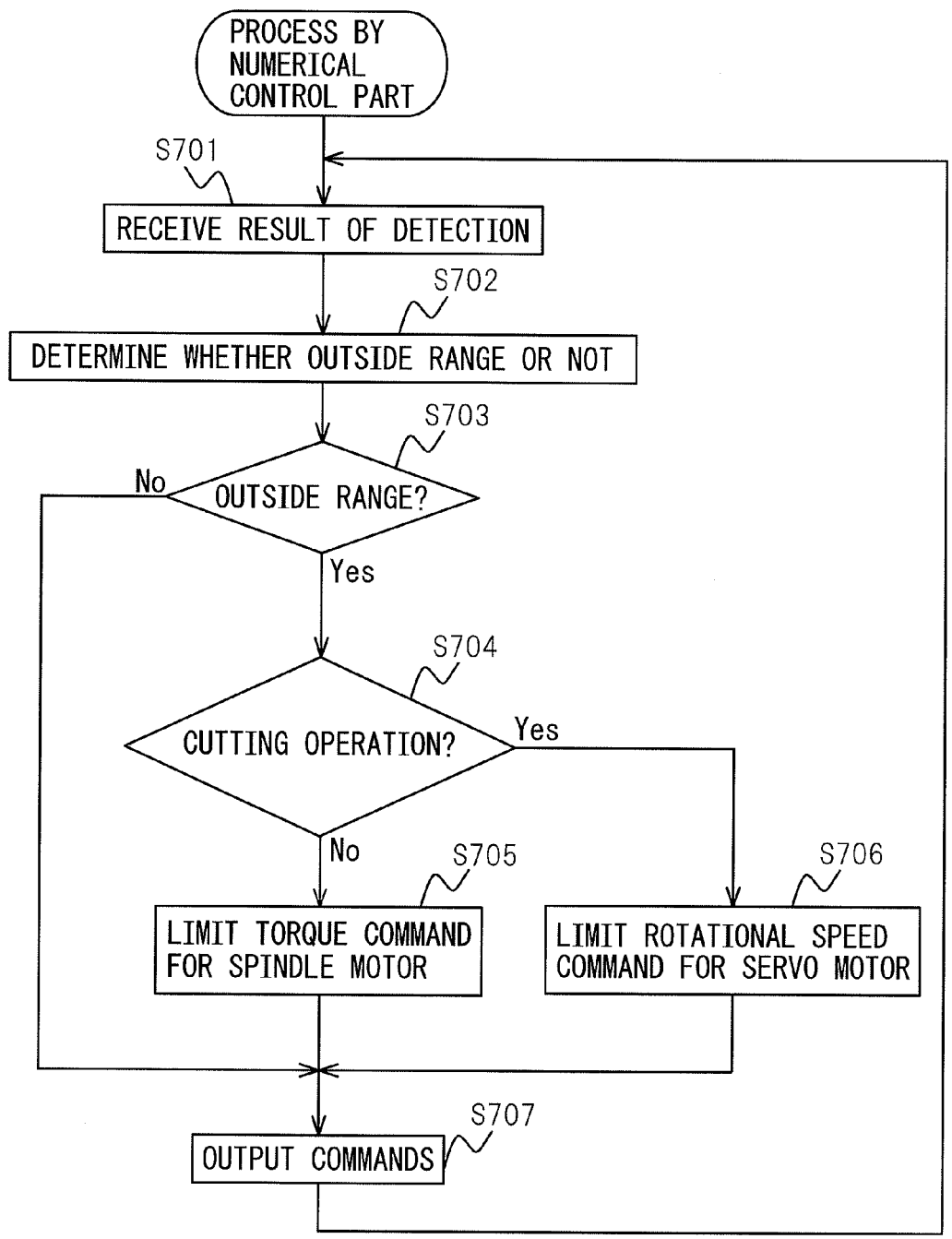
FIG. 14 is a flowchart illustrating an operational flow of the motor control apparatus according to the second specific example of the sixth embodiment.

FIG. 14 is a flowchart illustrating an operational flow of the numerical control part in the motor control apparatus according to the second specific example of the sixth embodiment. The operation of the converter control part 13 in the motor control apparatus 1 according to the second specific example of the sixth embodiment is the same as that of the fourth embodiment described with reference to FIG. 8, and therefore, will not be further described herein.

In step S701, the numerical control part 15 receives the result of the detection made by the detecting unit 21 from the converter control part 13 via the communication line. Next, in step S702, the determining unit 41 in the numerical control part 15 determines, based on the result of the detection by the detecting unit 21, whether or not the AC current or power input to the converter 11 lies outside the predetermined range. If, in step S703, the result of the determination indicates that the AC current or power input to the converter 11 lies outside the predetermined range, the process proceeds to step S704, otherwise the process proceeds to step S707. In step S704, the numerical control part 15 determines whether the machine tool is in cutting operation or not. If it is in cutting operation, the process proceeds to step S706; otherwise, the process proceeds to step S705. In step S705, the numerical control part 15 modifies the motor operation command for the spindle motor 2-1 so that the spindle motor 2-1 will run with a torque lower than the torque commanded by the torque command originally specified in the motor operation command. On the other hand, in step S706, the numerical control part 15 modifies the motor operation command for the servo motor 2-2 so that the servo motor 2-2 will run at a rotational speed slower than the rotational speed commanded by the rotational speed command originally specified in the motor operation command. In step S707, the numerical control part 15 supplies the motor operation commands to the spindle motor inverter control part 14-1 and the servo motor inverter control part 14-2, respectively. The spindle motor inverter control part 14-1 outputs a switching signal for controlling the on/off operation of the switching device in the spindle motor inverter 12-1 in accordance with the received motor operation command, and the servo motor inverter control part 14-2 outputs a switching signal for controlling the on/off operation of the switching device in the servo motor inverter 12-2 in accordance with the received motor operation command.

In the first specific example of the sixth embodiment, the result of the determination made by the determining unit 22 that determines whether or not the AC current or power input to the converter 11 lies outside the predetermined range has been transferred from the notifying means 23 to the numerical control part 15, but in the third specific example of the sixth embodiment, the result of the determination made by the determining unit 22 is transferred from the notifying means 23 to the spindle motor inverter control part 14-1 as well as to the numerical control part 15. The reason for this is as follows. In the motor control apparatus 1 adapted for use in a machine tool that performs cutting by using the spindle motor 2-1 for rotating the tool or work and the servo motor 2-2 for contouring control, there are cases where a program for controlling the AC conversion operation of the spindle motor inverter 12-1 that supplies AC power to drive the spindle motor 2-1 is maintained within the spindle motor inverter control part 14-1 in the spindle motor inverter 12-1, while a program for controlling the AC conversion operation of the servo motor inverter 12-2 that supplies AC power to drive the servo motor 2-2 is maintained within the numerical control part 15. In view this, in the third specific example of the sixth embodiment, the result of the determination made by the determining unit 22 is transferred from the notifying unit 23 not only to the numerical control part 15 but also to the spindle motor inverter control part 14-1. With this provision, when the AC current or power input to the converter 11 lies outside the predetermined range, if the machine tool is in cutting operation, the torque command to the spindle motor 2-1 is limited by the spindle motor inverter control part 14-1, and if the machine tool is not in cutting operation, the command for the rotational speed of the servo motor 2-2 is limited by the numerical control part 15.

Figure 15:
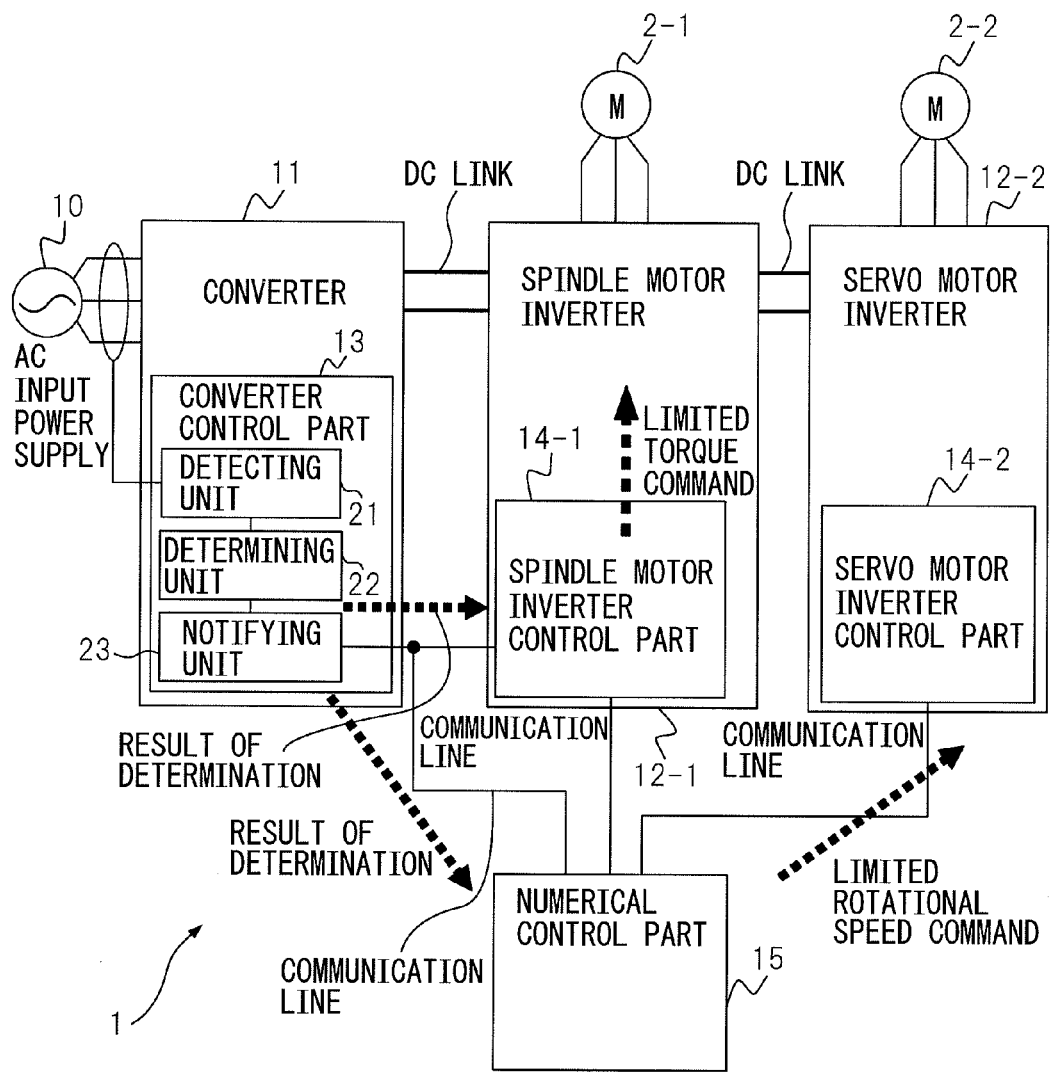
FIG. 15 is a block diagram showing a motor control apparatus according to a third specific example of the sixth embodiment.

FIG. 15 is a block diagram showing the motor control apparatus according to the third specific example of the sixth embodiment. As shown in FIG. 15, in the third specific example of the sixth embodiment, the detecting unit 21 that detects the AC current or power input to the converter 11, the determining unit 22 that determines, based on the result of the detection by the detecting unit 21, whether or not the AC current or power input to the converter 11 lies outside the predetermined range, and the notifying unit 23 which notifies the spindle motor inverter control part 14-1 and the numerical control part 15 of the result of the determination made by the determining unit 22, are provided within the converter control part 13. The converter control part 13 is connected via communication lines to the spindle motor inverter control part 14-1 and the numerical control part 15, respectively, and the result of the determination, output from the notifying unit 23 in the converter control part 13, is transmitted via the communication lines to the spindle motor inverter control part 14-1 and the numerical control part 15.

When the result of the determination indicates that the AC current or power input to the converter 11 lies outside the predetermined range, if the machine tool is not in cutting operation, the spindle motor inverter control part 14-1 controls the AC output of the spindle motor inverter 12-1 so that the spindle motor 2-1 will run with a torque lower than the torque commanded by the torque command originally specified in the motor operation command received from the numerical control part 15, and supplies the thus modified command to the spindle motor inverter control part 14-1. On the other hand, when the result of the determination indicates that the AC current or power input to the converter 11 lies outside the predetermined range, if the machine tool is in cutting operation, the numerical control part 15 modifies the motor operation command for the servo motor 2-2 so that the servo motor 2-2 will run at a rotational speed slower than the rotational speed commanded by the rotational speed command originally specified in the motor operation command, and supplies the thus modified command to the servo motor inverter control part 14-2.

Figure 16:
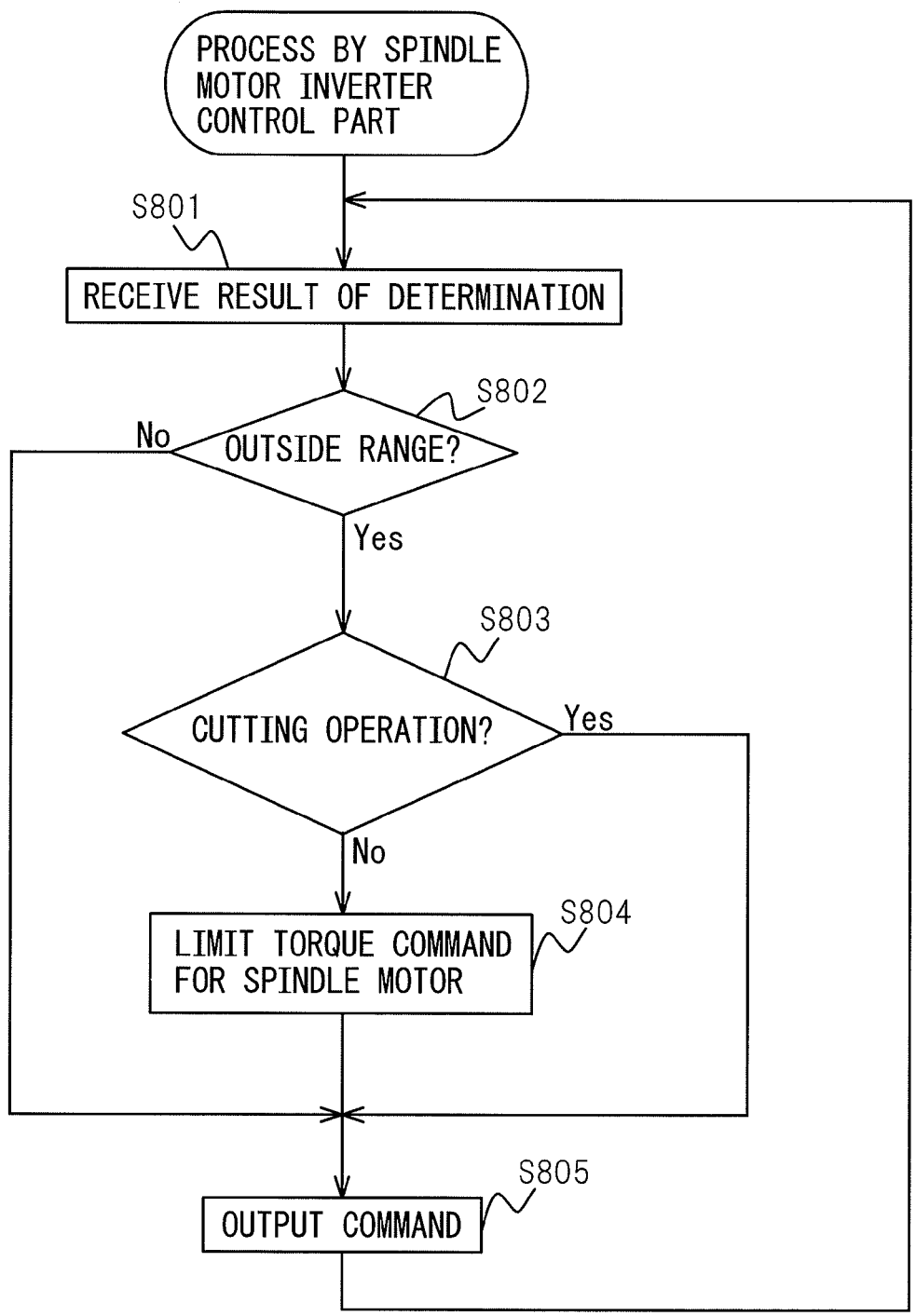
FIG. 16 is a flowchart illustrating an operational flow of a spindle motor inverter control part in the motor control apparatus according to the third specific example of the sixth embodiment.
Figure 17:
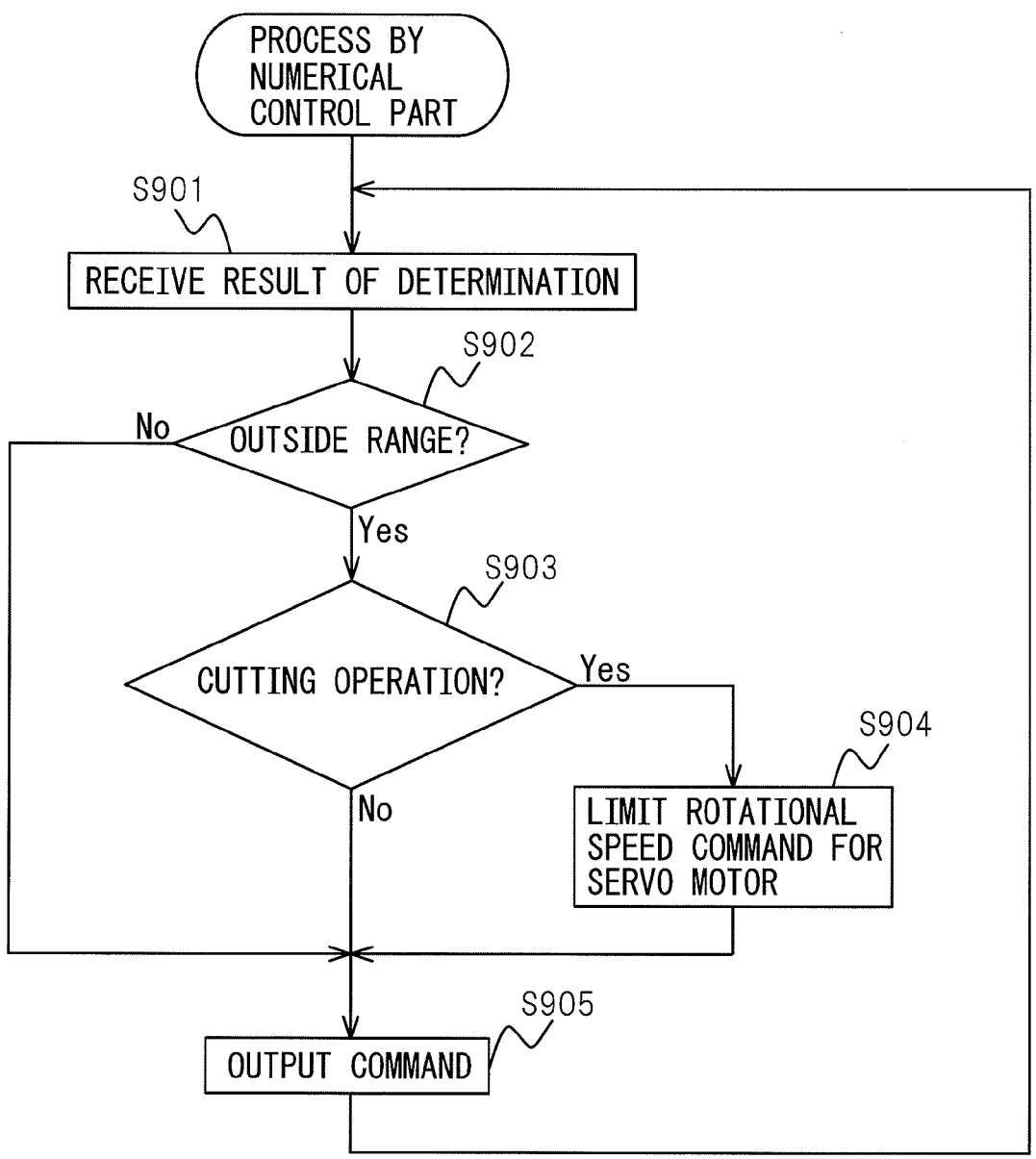
FIG. 17 is a flowchart illustrating an operational flow of a numerical control part in the motor control apparatus according to the third specific example of the sixth embodiment.

FIG. 16 is a flowchart illustrating an operational flow of the spindle motor inverter control part in the motor control apparatus according to the third specific example of the sixth embodiment. FIG. 17 is a flowchart illustrating an operational flow of the numerical control part in the motor control apparatus according to the third specific example of the sixth embodiment. The operation of the converter control part 13 in the motor control apparatus 1 according to the third specific example of the sixth embodiment is the same as that of the third embodiment described with reference to FIG. 6, and therefore, will not be further described herein.

In step S801 of FIG. 16, the spindle motor inverter control part 14-1 receives the result of the determination made by the determining unit 22 from the converter control part 13 via the communication line. If, in step S802, the result of the determination indicates that the AC current or power input to the converter 11 lies outside the predetermined range, the process proceeds to step S803, otherwise the process proceeds to step S805. In step S803, the spindle motor inverter control part 14-1 determines whether the machine tool is in cutting operation or not, based on the information acquired from the numerical control part 15. If it is in cutting operation, the process proceeds to step S805; otherwise, the process proceeds to step S804. In step S804, the spindle motor inverter control part 14-1 limits the torque command received from the numerical control part 15 so that the spindle motor 2-1 will run with a torque lower than the torque originally commanded by the motor operation command. In step S805, the motor operation command for the spindle motor 2-1 is supplied to the spindle motor inverter control part 14-1. The spindle motor inverter control part 14-1 outputs a switching signal for controlling the on/off operation of the switching device in the spindle motor inverter 12-1 in accordance with the received motor operation command.

In step S901 of FIG. 17, the numerical control part 15 receives the result of the determination made by the determining unit 22 from the converter control part 13 via the communication line. If, in step S902, the result of the determination indicates that the AC current or power input to the converter 11 lies outside the predetermined range, the process proceeds to step S903, otherwise the process proceeds to step S905. In step S903, the numerical control part 15 determines whether the machine tool is in cutting operation or not. If it is in cutting operation, the process proceeds to step S904; otherwise, the process proceeds to step S905. In step S904, the numerical control part 15 modifies the motor operation command for the servo motor 2-2 so that the servo motor 2-2 will run at a rotational speed slower than the rotational speed commanded by the rotational speed command originally specified in the motor operation command. In step S905, the motor operation command for the servo motor 2-2 is supplied to the servo motor inverter control part 14-2. The servo motor inverter control part 14-2 outputs a switching signal for controlling the on/off operation of the switching device in the servo motor inverter 12-2 in accordance with the received motor operation command.

As described above, when the AC current or power input to the converter 11 lies outside the predetermined range, if the machine tool is not in cutting operation, the spindle motor inverter control part 14-1 controls the AC output of the spindle motor inverter 12-1 so that the spindle motor 2-1 will run with a torque lower than the torque commanded by the torque command originally specified in the motor operation command, and if the machine tool is in cutting operation, the servo motor inverter control part 14-2 controls the AC output of the servo motor inverter 12-2 so that the servo motor 2-2 will run at a rotational speed slower than the rotational speed commanded by the rotational speed command originally specified in the motor operation command; accordingly, the same effect as that of the first to fourth embodiments can be achieved, while avoiding a situation where the spindle motor 2-1 is stalled during the cutting operation due to insufficient torque. Further, in the sixth embodiment also, by providing the detecting unit, determining unit, and notifying unit such as provided in the first to fourth embodiments, a motor control apparatus that is low cost, space saving, and simple in construction can be achieved.

The present invention can be applied to a machine tool system in which motors are provided one for each drive axis of a machine tool and in which the motors (spindle motor and servo motor) are driven by a motor control apparatus having a converter for converting input AC power to DC power and an inverter for converting the DC output of the converter to AC power to be supplied as drive power to drive each motor. The invention can also be applied as a motor control apparatus for driving motors provided in other industrial machines or various kinds of robots.

In providing a motor control apparatus which supplies drive power to a motor by first converting input AC to DC for output and then converting the DC output back to AC for driving the motor, the present invention can achieve a motor control apparatus that is low cost, space saving, and simple in construction and that can prevent an excessive current exceeding an allowable limit from flowing into the AC input side of a converter.

When the AC current or power input to the converter lies outside the predetermined range, the motor control apparatus controls the AC output of the inverter so that the motor is operated in accordance with a limited torque command produced by limiting the torque command originally specified in the motor operation command; in this way, an excessive current exceeding the allowable limit can be prevented from flowing into the AC input side of the converter. More specifically, when the AC current or power input to the converter lies outside the predetermined range, the motor is controlled to operate in accordance with a limited torque command produced by limiting the normal torque command originally specified in the motor operation command (i.e., a torque command lower in value than the normal torque command), so that the power consumption of the motor decreases, as a result of which the power demanded by the inverter also decreases, and hence the AC current or power input to the converter decreases.

Accordingly, even if a situation occurs where an output exceeding the allowable output of the converter is demanded from the inverter, for example, when supplying large AC power from the inverter to the motor, such as when driving the motor with a large output, the motor control apparatus does not stop due to an alarm condition, because an excessive current exceeding the allowable limit does not flow into the AC input side of the converter. Since this serves to prevent the machine tool whose motors are being driven and controlled by the motor control apparatus from stopping in the middle of the operation, the utilization efficiency of the machine tool can be enhanced. Furthermore, when designing the motor control apparatus, there is no need to choose a converter having an excessively large output in order to prevent the motor control apparatus from stopping due to an alarm condition, the apparatus of the invention is also advantageous in terms of installation space and cost.

As has been described above, according to the first embodiment, the detecting unit that detects the AC current or power input to the converter, the determining unit that determines, based on the result of the detection by the detecting unit, whether or not the AC current or power input to the converter lies outside the predetermined range, and the notifying unit that notifies the inverter control part of the result of the determination made by the determining unit are provided within the converter control part that controls the DC output of the converter. On the other hand, according to the second embodiment, the detecting unit that detects the AC current or power input to the converter and the notifying unit that notifies the inverter control part of the result of the detection made by the detecting unit are provided within the converter control part that controls the DC output of the converter, while the determining unit that determines, based on the result of the detection, whether or not the AC current or power input to the converter lies outside the predetermined range is provided within the inverter control part. According to the third embodiment, the detecting unit that detects the AC current or power input to the converter, the determining unit that determines, based on the result of the detection by the detecting unit, whether or not the AC current or power input to the converter lies outside the predetermined range, and the notifying unit that notifies the numerical control part of the result of the determination made by the determining unit are provided within the converter control part that controls the DC output of the converter. On the other hand, according to the fourth embodiment, the detecting unit that detects the AC current or power input to the converter and the notifying unit that notifies the numerical control part of the result of the detection made by the detecting unit are provided within the converter control part that controls the DC output of the converter, while the determining unit that determines, based on the result of the detection, whether or not the AC current or power input to the converter lies outside the predetermined range is provided within the numerical control part. In this way, the motor control apparatus according to the first to fourth embodiments achieves a simple construction with a low-cost and space-saving design. Compared, for example, with the techniques disclosed in Japanese Unexamined Patent Publication No. H04-106348, Japanese Examined Patent Publication No. H07-10198, and Japanese Unexamined Patent Publication No. 2010-233304, the first to fourth embodiments are advantageous in that the number of detectors used can be reduced.

Further, according to the fifth embodiment in which the motor control apparatus drives and controls the spindle motor and the servo motor, when the AC current or power input to the converter lies outside the predetermined range, the spindle motor inverter control part controls the AC output of the spindle motor inverter so that the spindle motor is operated in accordance with a limited torque command produced by limiting the torque command originally specified in the motor operation command; since this means that the magnitude of the torque of the spindle motor unrelated to contouring control is limited, the above-described effect can be achieved without affecting the shape accuracy of the contouring control.

In the fifth embodiment also, by providing the detecting unit, determining unit, and notifying unit such as provided in the first to fourth embodiments, a motor control apparatus that is low cost, space saving, and simple in construction can be achieved.

On the other hand, according to the sixth embodiment in which the motor control apparatus is adapted for use in a machine tool that performs cutting by using a spindle motor for rotating the tool or work and a servo motor for contouring control, when the AC current or power input to the converter lies outside the predetermined range, if the machine tool is not in cutting operation, the spindle motor inverter control part controls the AC output of the spindle motor inverter so that the spindle motor is operated in accordance with a limited torque command produced by limiting the torque command originally specified in the motor operation command (i.e., a torque command lower in value than the normal torque command), and if the machine tool is in cutting operation, the servo motor inverter control part controls the AC output of the servo motor inverter so that the servo motor is operated in accordance with a limited rotational speed command produced by limiting the rotational speed command originally specified in the motor operation command (i.e., at a rotational speed slower than the normal rotational speed); accordingly, the above-described effect can be achieved, while avoiding a situation where the spindle motor is stalled during cutting operation due to insufficient torque.

As earlier described, the techniques disclosed in Japanese Unexamined Patent Publication No. H04-106348, Japanese Examined Patent Publication No. H07-10198, and Japanese Unexamined Patent Publication No. 2010-233304 are intended to operate the air-conditioning equipment in a low performance state, depending on the result of monitoring, by lowering the frequency of the AC (i.e., the AC output of the inverter) to be delivered to the compressor, but are not intended to actively control the operating state of the compressor; by contrast, according to the first to sixth embodiment of the invention, since the torque or rotational speed is controlled according to the operating state of the motor, meticulous control can be achieved. Further, according to the fifth and sixth embodiments in which the motor control apparatus is adapted for use in a machine tool equipped with a spindle motor and a servo motor, since the apparatus does not lower the output frequency of the AC for driving the spindle motor, i.e., the rotational speed and the output torque thereof, as is done by the techniques disclosed in Japanese Unexamined Patent Publication No. H04-106348, Japanese Examined Patent Publication No. H07-10198, and Japanese Unexamined Patent Publication No. 2010-233304, the cutting operation itself is unaffected.

What is claimed is:

1. A motor control apparatus for a machine tool that performs cutting by using a spindle motor for rotating a tool or work and a servo motor for contouring control, the motor control apparatus comprising:
    a converter which converts input AC to DC for output;
    a spindle motor inverter which converts the DC output of said converter to provide an AC output for driving said spindle motor, and a control part for the same;
    a servo motor inverter which converts the DC output of said converter to provide an AC output for driving said servo motor, and a control part for the same; and
    a numerical control part which outputs a motor operation command for commanding the operation of said spindle motor and said servo motor, wherein
    when AC current or power input to said converter lies outside a predetermined range,
        in case that said machine tool is not in cutting operation, then said spindle motor inverter control part controls the AC output of said spindle motor inverter so that said spindle motor is operated in accordance with a limited torque command produced by limiting a torque command originally specified in said motor operation command, and
        in case that said machine tool is in cutting operation, then said servo motor inverter control part controls the AC output of said servo motor inverter so that said servo motor is operated in accordance with a limited rotational speed command produced by limiting a rotational speed command originally specified in said motor operation command, without limiting the torque command originally specified in said motor operation command by said spindle motor inverter control part.

2. The motor control apparatus according to claim 1, wherein said converter includes a converter control part, and wherein
    said converter control part includes
        a detecting unit which detects the AC current or power input to said converter,
        a determining unit which, based on the result of said detection by said detecting unit, determines whether or not the AC current or power input to said converter lies outside said predetermined range, and
        a notifying unit which notifies said numerical control, part of the result of said determination made by said determining unit, wherein
            when the result of said determination indicates that the AC current or power input to said converter lies outside said predetermined range,
                in case that said machine tool is not in cutting operation, said numerical control part modifies said motor operation command for said spindle motor and supplies said modified motor operation command to said spindle motor inverter control part so that said spindle motor is operated in accordance with a limited torque command produced by limiting the torque command originally specified in said motor operation command, and in case that said machine tool is in cutting operation, said numerical control part modifies said motor operation command for said servo motor and supplies said modified motor operation command to said servo motor inverter control part so that said servo motor is operated in accordance with a limited rotational speed command produced by limiting the rotational speed command originally specified in said motor operation command.

3. The motor control apparatus according to claim 1, wherein said converter includes a converter control part, and wherein said converter control part includes
a detecting unit which detects the AC current or power input to said converter, and
a notifying unit which notifies said numerical control part of the result of said detection made by said detecting unit, and said numerical control part includes
a determining unit which determines, based on the result of said detection, whether or not the AC current or power input to said converter lies outside said predetermined range, wherein
when the result of said determination indicates that the AC current or power input to said converter lies outside said predetermined range,
when said machine tool is not in cutting operation, said numerical control part modifies said motor operation command for said spindle motor and supplies said modified motor operation command to said spindle motor inverter control part so that said spindle motor is operated in accordance with a limited torque command produced by limiting the torque command originally specified in said motor operation command, and
when said machine tool is in cutting operation, said numerical control part modifies said motor operation command for said servo motor and supplies said modified motor operation command to said servo motor inverter control part so that said servo motor is operated in accordance with a limited rotational speed command produced by limiting the rotational speed command originally specified in said motor operation command.

4. The motor control apparatus according to claim 1, wherein said converter includes a converter control part, and wherein said converter control part includes
a detecting unit which detects the AC current or power input to said converter,
a determining unit which, based on the result of said detection by said detecting unit, determines whether or not the AC current or power input to said converter lies outside said predetermined range, and
a notifying unit which notifies said spindle motor inverter control part and said numerical control part of the result of said determination made by said determining unit, wherein
when the result of said determination indicates that the AC current or power input to said converter lies outside said predetermined range,
in case that said machine tool is not in cutting operation, then said spindle motor inverter control part controls the AC output of said spindle motor inverter so that said spindle motor is operated in accordance with a limited torque command produced by limiting the torque command originally specified in said motor operation command supplied from said numerical control part, and
in case that said machine tool is in cutting operation, then said numerical control part modifies said motor operation command for said servo motor and supplies said modified motor operation command to said servo motor inverter control part so that said servo motor is operated in accordance with a limited rotational speed command produced by limiting the rotational speed command originally specified in said motor operation command.

\* \* \* \* \*